United States Patent
Blair et al.

(10) Patent No.: US 12,527,606 B1
(45) Date of Patent: Jan. 20, 2026

(54) SYSTEM AND METHOD FOR BONE FIXATION BASED ON BONE QUALITY

(71) Applicant: MedShape, Inc., Atlanta, GA (US)

(72) Inventors: Jeremy Webster Blair, Atlanta, GA (US); Ryan Walter O'Flaherty, Atlanta, GA (US); David Lee Safranski, Atlanta, GA (US); Gregory C. Berlet, Westerville, OH (US)

(73) Assignee: MEDSHAPE, INC., Atlanta, GA (US)

( * ) Notice: Subject to any disclaimer, the term of this patent is extended or adjusted under 35 U.S.C. 154(b) by 87 days.

(21) Appl. No.: 17/822,697

(22) Filed: Aug. 26, 2022

Related U.S. Application Data

(60) Provisional application No. 63/237,449, filed on Aug. 26, 2021.

(51) Int. Cl.
A61B 17/72 (2006.01)

(52) U.S. Cl.
CPC ...... *A61B 17/7225* (2013.01); *A61B 17/7291* (2013.01); *A61B 17/7233* (2013.01)

(58) Field of Classification Search
CPC ............ A61B 17/7216; A61B 17/7225; A61B 17/72–7291; A61B 5/4504; A61B 5/4509; A61B 5/4571–4595; A61B 2090/066; A61B 17/3472
See application file for complete search history.

(56) References Cited

U.S. PATENT DOCUMENTS

| | | | |
|---|---|---|---|
| 3,433,220 A | 3/1969 | Zickel | |
| 3,986,504 A | 10/1976 | Avila | |
| 4,175,555 A | 11/1979 | Herbert | |
| 4,537,185 A | 8/1985 | Stednitz | |
| 4,667,664 A | 5/1987 | Taylor | |
| 4,827,917 A | 5/1989 | Brumfield | |
| 4,865,025 A | 9/1989 | Buzzi | |
| 4,889,111 A | 12/1989 | Azer | |

(Continued)

FOREIGN PATENT DOCUMENTS

| CN | 2472682 Y | 1/2002 |
|---|---|---|
| DE | 19708279 | 9/1998 |

(Continued)

OTHER PUBLICATIONS

International Search Report and Written Opinion mailed May 13, 2022 for PCT/US2022/17414.

(Continued)

*Primary Examiner* — Jacqueline T Johanas
*Assistant Examiner* — Anna V. Little
(74) *Attorney, Agent, or Firm* — Husch Blackwell LLP; Bryan D. Stewart

(57) ABSTRACT

A system and method for fixation of bone portions may include a medical device and a bone quality assessment device. According to one embodiment, the bone quality assessment device is used to determine bone quality by measuring the shear strength of the bone at the site of insertion of the medical device. Once bone quality is determined, an appropriate contracting element may be selected that applies compression forces to the bone portions. In certain embodiments, the bone quality determination will also inform the level of torque applied to helical elements to secure the medical device to the bone portions.

21 Claims, 17 Drawing Sheets

(56) References Cited

U.S. PATENT DOCUMENTS

| | | | |
|---|---|---|---|
| 5,019,079 A | 5/1991 | Ross | |
| 5,034,013 A | 7/1991 | Kyle | |
| 5,057,103 A * | 10/1991 | Davis | A61B 17/921 606/68 |
| 5,112,333 A | 5/1992 | Fixel | |
| 5,415,660 A | 5/1995 | Campbell | |
| 5,489,284 A | 2/1996 | James | |
| 5,505,733 A | 4/1996 | Justin | |
| 5,505,734 A | 4/1996 | Caniggia | |
| 5,620,445 A | 4/1997 | Brosnahan | |
| D379,855 S | 6/1997 | Perry | |
| 5,653,709 A | 8/1997 | Frigg | |
| 5,658,287 A | 8/1997 | Hofmann | |
| 5,766,174 A | 6/1998 | Perry | |
| 5,836,066 A | 11/1998 | Ingram | |
| 5,855,579 A | 1/1999 | James | |
| 5,882,444 A | 3/1999 | Flomenblit | |
| 5,928,235 A | 7/1999 | Friedl | |
| 5,964,768 A | 10/1999 | Heubner | |
| 5,976,138 A | 11/1999 | Baumgart | |
| 6,001,101 A | 12/1999 | Augagneur et al. | |
| 6,048,344 A | 4/2000 | Schenk | |
| 6,123,708 A | 9/2000 | Kilpela | |
| 6,168,595 B1 | 1/2001 | Durham | |
| 6,200,317 B1 | 3/2001 | Aalsma | |
| 6,224,600 B1 * | 5/2001 | Protogirou | A61B 17/7225 606/68 |
| 6,228,086 B1 | 5/2001 | Wahl | |
| 6,261,290 B1 | 7/2001 | Friedl | |
| 6,306,140 B1 | 10/2001 | Siddiqui | |
| 6,488,684 B2 | 12/2002 | Bramlet | |
| 6,579,293 B1 | 6/2003 | Chandran | |
| 6,783,529 B2 | 8/2004 | Hover | |
| 6,786,908 B2 | 9/2004 | Hover | |
| 6,808,527 B2 | 10/2004 | Lower | |
| 6,921,400 B2 | 7/2005 | Sohngen | |
| 7,005,018 B2 | 2/2006 | Julien | |
| 7,018,380 B2 | 3/2006 | Cole | |
| 7,056,322 B2 | 6/2006 | Davison | |
| 7,232,443 B2 | 6/2007 | Zander | |
| 7,455,673 B2 | 11/2008 | Gotfried | |
| D604,846 S | 11/2009 | Hintermann | |
| 7,648,599 B2 | 1/2010 | Berendt | |
| D611,145 S | 3/2010 | Khalil | |
| D611,225 S | 3/2010 | Khalil | |
| 7,708,738 B2 | 5/2010 | Fourcault et al. | |
| 7,731,738 B2 | 6/2010 | Jackson et al. | |
| 7,763,022 B2 | 7/2010 | Speitling | |
| 7,771,428 B2 | 8/2010 | Siravo | |
| 7,794,483 B2 | 9/2010 | Capanni | |
| D625,818 S | 10/2010 | Khalil | |
| 7,985,222 B2 | 7/2011 | Gall | |
| 8,118,952 B2 | 2/2012 | Gall | |
| 8,231,629 B2 | 7/2012 | Lerner | |
| 8,267,975 B2 | 9/2012 | Mccombs et al. | |
| 8,491,583 B2 | 7/2013 | Gall | |
| D693,929 S | 11/2013 | Fagan | |
| 8,623,060 B2 | 1/2014 | Vlahos | |
| 8,702,768 B2 | 4/2014 | Tipirneni | |
| 9,011,505 B2 | 4/2015 | Prandi et al. | |
| 9,113,976 B2 | 8/2015 | Yevmenenko et al. | |
| D775,351 S | 12/2016 | Agarwal | |
| 9,861,413 B2 | 1/2018 | Palmer et al. | |
| D810,933 S | 2/2018 | Chrisman | |
| D939,704 S | 12/2021 | Bales | |
| 11,291,488 B1 | 4/2022 | Oflaherty | |
| 2002/0055742 A1 * | 5/2002 | Lieberman | A61B 17/7032 606/301 |
| 2002/0058949 A1 | 5/2002 | Iaia | |
| 2003/0055314 A1 | 3/2003 | Petitto | |
| 2003/0065332 A1 | 4/2003 | Tenhuisen | |
| 2004/0002710 A1 | 1/2004 | Han | |
| 2004/0137033 A1 | 7/2004 | Calhoun | |
| 2004/0230193 A1 | 11/2004 | Cheung | |
| 2005/0096656 A1 | 5/2005 | Behrens | |
| 2005/0107791 A1 | 5/2005 | Manderson | |
| 2005/0159749 A1 | 7/2005 | Levy | |
| 2006/0064106 A1 | 3/2006 | Fernandez | |
| 2006/0173461 A1 | 8/2006 | Kay et al. | |
| 2006/0200141 A1 * | 9/2006 | Janna | A61B 17/7291 606/62 |
| 2006/0264945 A1 | 11/2006 | Edidin | |
| 2006/0264954 A1 | 11/2006 | Sweeney | |
| 2007/0100342 A1 | 5/2007 | Green | |
| 2007/0123873 A1 * | 5/2007 | Czartoski | A61B 17/7233 606/62 |
| 2007/0260248 A1 | 11/2007 | Tipirneni et al. | |
| 2007/0270855 A1 | 11/2007 | Partin | |
| 2008/0147126 A1 | 6/2008 | Tipirneni et al. | |
| 2008/0147127 A1 | 6/2008 | Tipirneni | |
| 2008/0287949 A1 | 11/2008 | Keith | |
| 2008/0300510 A1 * | 12/2008 | Schwyn | G01N 3/22 600/587 |
| 2008/0300597 A1 | 12/2008 | Morgan | |
| 2009/0105768 A1 | 4/2009 | Cragg | |
| 2009/0149861 A1 | 6/2009 | Brodsky | |
| 2009/0157123 A1 | 6/2009 | Appenzeller | |
| 2010/0010490 A1 | 1/2010 | Brigido | |
| 2010/0076498 A1 | 3/2010 | Tyber et al. | |
| 2010/0076503 A1 * | 3/2010 | Beyar | A61B 17/1637 606/86 R |
| 2010/0179551 A1 | 7/2010 | Keller | |
| 2010/0268229 A1 | 10/2010 | Siravo | |
| 2011/0004212 A1 * | 1/2011 | Gall | A61B 17/7225 606/62 |
| 2012/0316607 A1 | 12/2012 | Frenk et al. | |
| 2013/0338669 A1 * | 12/2013 | Brianza | A61B 17/1664 606/80 |
| 2014/0031794 A1 * | 1/2014 | Windolf | A61B 17/8805 604/513 |
| 2014/0228845 A1 * | 8/2014 | Gorsline | A61B 17/7291 606/62 |
| 2016/0213412 A1 * | 7/2016 | Palmer | A61B 17/866 |
| 2017/0196608 A1 | 7/2017 | Castaneda et al. | |
| 2017/0348037 A1 * | 12/2017 | Sexson | A61B 17/1626 |
| 2017/0360489 A1 | 12/2017 | Palmer et al. | |
| 2018/0092677 A1 | 4/2018 | Peterson et al. | |
| 2019/0133657 A1 | 5/2019 | Orbay et al. | |
| 2020/0038080 A1 | 2/2020 | Palmer et al. | |
| 2022/0280197 A1 | 9/2022 | Blair | |

FOREIGN PATENT DOCUMENTS

| | | | |
|---|---|---|---|
| WO | 199524870 | 9/1995 | |
| WO | 2005094705 | 10/2005 | |
| WO | WO-2015014771 A2 * | 2/2015 | A61B 17/1626 |

OTHER PUBLICATIONS

Extended European Search Report dated Mar. 4, 2010 for European Pat. Appl. No. 06758489.6.
Ankle Arthrodesis Nail Surgical Technique, pp. 1-16, BioMet, Inc., Warsaw, Indiana, USA, 2000.
Panta Arthrodesis Nail Surgical Technique brochure, pp. 1-23, Integra Lifosciences Corporation, Plainsboro, New Jersey.
Retro Nail Ankle Arthrodesis treats arthritic deformity, factures, failed fusion, retrieved from the Internet Apr. 4, 2007 at http://www.orthofix.com/products/retronail.asp?cid=5, ©2007 orthofix.com.
T2 Tibial Nailing System, Operative Technique, pp. 1-31, Stryker Trauma GmbH, Germany, 2004.
Tibiotalocalcaneal Fusion Using the VersaNail, Surgical Technique, pp. 1-15, DePuy Orthopaedics, Inc., Warsaw, Indiana, USA, 2002.
Versanail TTC, Surgical Technique Tibiotalocalcaneal Nailing System Options Made Easy, pp. 1-19, Trauma & Extremities Group, DePuy, a Johnson & Johnson Company, 2006.

* cited by examiner

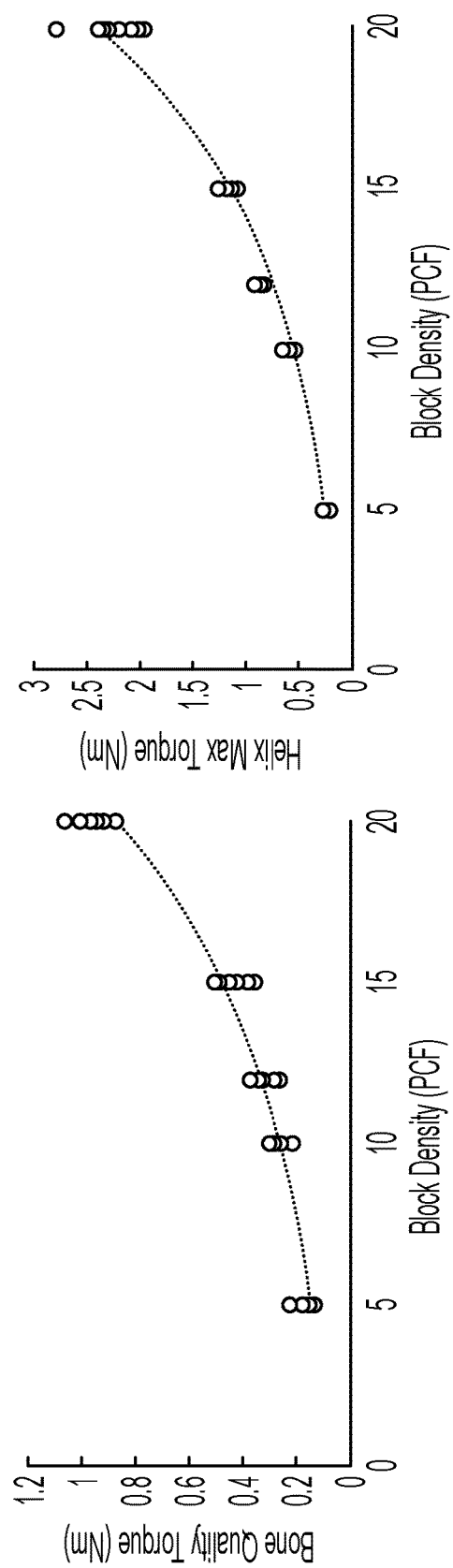
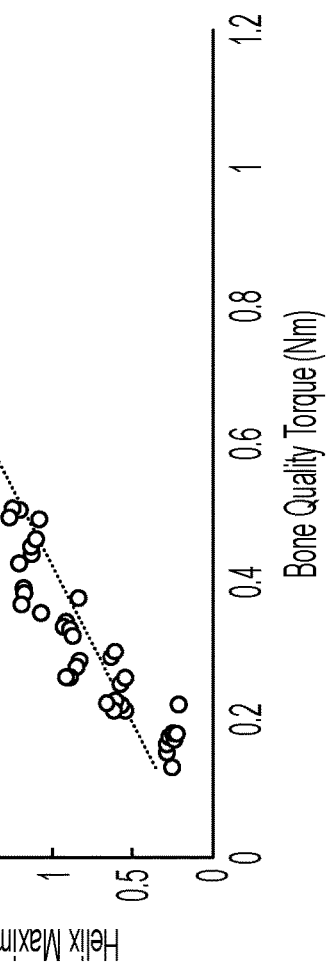
FIG. 9A
FIG. 9B
FIG. 9C

SYSTEM AND METHOD FOR BONE FIXATION BASED ON BONE QUALITY

CROSS REFERENCE TO RELATED APPLICATION

This application claims priority to U.S. Application No. 63/237,449, filed on Aug. 26, 2021, the disclosure of which is hereby incorporated by reference in its entirety.

BACKGROUND

Injuries such as fractures may be treated, in part, using continuous compression at the fracture. Compression typically involves compressing two or more bony fragments together to promote ossification and/or resettlement processes and heal the two or more bony fragments. Previous approaches include a compression device that is inserted into and compresses together two or more bony fragments. In such approaches, compressive forces are typically generated by threaded elements extending along at least a portion of the compression device (e.g., for example, at either end of the device). However, these previous approaches may suffer compression performance issues, such as insufficient or discontinuous compression.

In some instances, the quality of the bone fragments is a contributing cause of the aforementioned performance issues, among others. In particular, in some cases, the bone surrounding threaded elements may deteriorate if the bone is of insufficient quality, causing the compression device to fail. In some other cases, a compression device may push out of the bone if the compression force is too high. As such, there is a need for a method to assess bone quality as it relates to selecting a torque value and/or compression force used with a dynamic compression device.

SUMMARY

The present disclosure relates generally to systems and methods for determining bone quality in-situ, selecting a type of fixation device based on the bone quality, optimizing compression based on the bone quality, optimizing insertion torque for the selected fixation device based on bone quality, and for fixating bone fragments. In particular, the present disclosure relates to systems for determining bone quality by measuring the torque required to shear bone and methods for selecting compressive components based on such torque measurements.

In certain embodiments, the present disclosure includes a method for dynamic bone fixation comprising the steps of: (1) inserting a bone quality assessment device into a first bone portion of a plurality bone portions to be compressed via dynamic compression, (2) measuring a torque value for shearing the first bone portion with the bone quality assessment device, (3) selecting a contracting element for compressing the plurality of bone portions based on the torque value, and (4) inserting a medical device comprising the contracting element for applying dynamic compression into the plurality of bone portions.

In certain embodiments, the torque value is correlated to a bone quality of the plurality of bone portions.

In some embodiments, the method for dynamic bone fixation further comprises the step of creating a skin incision, wherein: (1) inserting the bone quality assessment device into the first bone portion of the patient comprises inserting the bone quality assessment device through the skin incision and into the first bone portion of the patient, and (2) inserting the medical device into the plurality of bone portions comprises inserting the dynamic compression bone fixation device through the skin incision and into the plurality of bone portions.

The bone quality assessment device may also be inserted into the first bone portion of the patient via a guide wire. The medical device may also be inserted into the plurality of bone portions via the guide wire. In certain embodiments, the medical device is a nail or a screw.

In certain embodiments, the method for dynamic bone fixation further comprises the steps of seating the medical device into the plurality of bone portions and engaging compression of the plurality of bone portions via the contracting element. In certain embodiments, the medical device does not compress the plurality of bone portions prior to engaging compression of the plurality of bone portions via the contracting element. In addition, in various embodiments, the plurality of bone portions to be compressed are bone fragments from a bone fracture to be repaired. In certain embodiments, the plurality of bone portions to be compressed are bones of a particular joint to be fused.

Another method for dynamic bone fixation comprises the steps of: (1) creating a skin incision on a patient, (2) inserting a guide wire through the skin incision, (3) inserting a bone quality assessment device into a bone portion of a patient via the guide wire, the bone portion a first bone portion of a plurality bone portions to be compressed via dynamic compression, (3) measuring a torque value for shearing the bone portion with the bone quality assessment device, (4) selecting a contracting element for compressing the plurality of bone portions based on the torque value, and (5) inserting a medical device comprising the contracting element via the guide wire for applying dynamic compression into the plurality of bone portions.

In certain embodiments, the torque value is correlated to bone quality of the plurality of bone portions.

In some embodiments, the plurality of bone portions to be compressed are bone fragments from a bone fracture to be repaired. In other embodiments, the plurality of bone portions to be compressed are bones of a particular joint to be fused.

In certain embodiments, the medical device is a nail. In other embodiments, the medical device is a screw.

In certain embodiments, the method for dynamic bone fixation further comprises the steps of seating the medical device into the plurality of bone portions and engaging compression of the plurality of bone portions via the contracting element.

In certain embodiments, the medical device does not compress the plurality of bone portions prior to engaging compression of the plurality of bone portions via the contracting element.

Yet another method for dynamic bone fixation comprises the steps of: (1) creating a skin incision on a patient, (2) inserting a guide wire through the skin incision, (3) inserting a medical device into a bone portion of a patient via the guide wire, the bone portion a first bone portion of a plurality bone portions to be compressed via dynamic compression, (4) measuring a torque value for shearing the bone portion with the bone quality assessment device, (5) selecting a contracting element for compressing the plurality of bone portions based on the torque value, (6) installing the contracting element within a medical device in a pre-tensioned state, (7) inserting a medical device comprising the contracting element via the guide wire into the plurality of bone portions in the pre-tensioned state, and (8) activating the contracting element from the pre-tensioned state to a tensioned state, thereby compressing the plurality of bone portions via the medical device.

Another method for dynamic bone fixation comprises the steps of: (1) inserting a bone quality assessment device into a bone portion of a patient, the bone portion a first bone portion of a plurality bone portions to be compressed via dynamic compression, (2) measuring a torque value for shearing the bone portion with the bone quality assessment device, (3) selecting a medical device comprising a contracting element for compressing the plurality of bone portions based on the torque value, and (4) inserting the medical device comprising the contracting element for applying dynamic compression into the plurality of bone portions.

In certain embodiments, a bone quality assessment device in accordance with the principles of this disclosure includes a shaft having a first end and a second end, a plurality of teeth disposed at the first end, a handle disposed at the second end, and a sensor for sensing torque applied to the shaft. In certain embodiments, the sensor may be a strain gauge or a torque gauge. In some embodiments, the shaft may be at least partially hollow.

According to a first aspect, a method of treating a bone fracture comprises: (1) creating a skin incision on a patient; (2) inserting a bone quality assessment device into a bone portion of a patient, the bone portion a first bone portion of a plurality of bone portions to be compressed; (4) measuring a torque value for shearing the bone portion with the bone quality assessment device, wherein the measured torque value is a maximum torque value for the bone portion; and (5) determining a type of device for compressing the plurality of bone portions based on the maximum torque value for the bone portion.

According to a second aspect, the method of the first aspect or any other aspect, wherein determining the type of device for compressing the plurality of bone portions based on the maximum torque value for the bone portion comprises determining whether a minimum insertion torque value for a particular device exceeds the maximum torque value.

According to a third aspect, the method of the second aspect or any other aspect, wherein: the minimum insertion torque value is a first minimum insertion torque value; and upon determining that the minimum insertion torque value for a particular device exceeds the maximum torque value, selecting a second device with a second minimum insertion torque value lower than the first minimum insertion torque value.

According to a fourth aspect, the method of the third aspect or any other aspect, wherein the particular device is a screw.

According to a fifth aspect, the method of the fourth aspect or any other aspect, wherein the second device is a nail.

According to a sixth aspect, the method of the second aspect or any other aspect, wherein upon determining that the minimum insertion torque value for the particular device is lower than the maximum torque value, selecting an insertion torque value for the particular device based on a comparison of the maximum torque value for the bone portion with a corresponding maximum torque value for the particular device.

According to a seventh aspect, the method of the sixth aspect or any other aspect, wherein the selected insertion torque value is about 50-75% of the corresponding maximum torque value for the particular device.

According to an eighth aspect, the method of the seventh aspect or any other aspect, the method further comprising inserting the particular device into the bone portion at the selected insertion torque value.

According to a ninth aspect, the method of the eighth aspect or any other aspect, the method further comprising configuring an insertion device for a maximum torque of the selected insertion torque value.

According to a tenth aspect, the method of the eighth aspect or any other aspect, the method further comprising selecting an insertion device corresponding to the selected insertion torque value for inserting the particular device.

According to an eleventh aspect, the method of the seventh aspect or any other aspect, the method further comprising selecting a contracting element for compressing the plurality of bone portions based on the torque value.

According to a twelfth aspect, the method of the first aspect or any other aspect, the method further comprising selecting a contracting element for compressing the plurality of bone portions based on the torque value.

According to a thirteenth aspect, the method of the first aspect or any other aspect, the method further comprising selecting a specific device comprising a contracting element for compressing the plurality of bone portions based on the torque value.

According to a fourteenth aspect, the method of the first aspect or any other aspect, wherein the bone quality assessment device comprises blades or teeth.

According to a fifteenth aspect, the method of the fourteenth aspect or any other aspect, wherein the bone quality assessment device is a punch cutter.

According to sixteenth aspect, a method of diagnosing bone density in-situ comprising: creating a skin incision on a patient; inserting a bone quality assessment device into a bone portion of a patient; measuring a torque value for shearing the bone portion with the bone quality assessment device; and correlating the torque value with a bone density of the bone portion.

According to a twenty-first aspect, a method of treating a bone fracture comprising: creating a skin incision on a patient; inserting a bone quality assessment device into a bone portion of a patient, the bone portion a first bone portion of a plurality of bone portions to be compressed; measuring a torque value for shearing the bone portion with the bone quality assessment device, wherein the measured torque value is a maximum torque value for the bone portion; and selecting an insertion torque value for a particular device based on a comparison of the maximum torque value for the bone portion with a corresponding maximum torque value for the particular device.

According to a twenty-second aspect, the method of the twenty-first aspect or any other aspect, wherein the selected insertion torque value is about 50-75% of the corresponding maximum torque value for the particular device.

According to a twenty-third aspect, the method of the twenty-first aspect or any other aspect, the method further comprising inserting the particular device into the bone portion at the selected insertion torque value.

According to a twenty-fourth aspect, the method of the twenty-first aspect or any other aspect, the method further comprising configuring an insertion device for a maximum torque of the selected insertion torque value.

According to a twenty-fifth aspect, the method of the twenty-first aspect or any other aspect, the method further comprising selecting an insertion device corresponding to the selected insertion torque value for inserting the particular device.

According to a twenty-sixth aspect, the method of the twenty-first aspect or any other aspect, the method further comprising selecting a contracting element for compressing the plurality of bone portions based on the torque value.

According to a twenty-seventh aspect, the method of the twenty-first aspect or any other aspect, the method further comprising selecting a contracting element for compressing the plurality of bone portions based on the torque value.

According to a twenty-eighth aspect, the method of the twenty-first aspect or any other aspect, the method further comprising selecting a specific device comprising a contracting element for compressing the plurality of bone portions based on the torque value.

According to a twenty-ninth aspect, the method of the twenty-first aspect or any other aspect, wherein the bone quality assessment device comprises blades or teeth.

According to a thirtieth aspect, the method of the twenty-first aspect or any other aspect, wherein the bone quality assessment device is a punch cutter.

These and other aspects, features, and benefits of the claimed invention(s) will become apparent from the following detailed written description of the preferred embodiments and aspects taken in conjunction with the following drawings, although variations and modifications thereto may be made without departing from the spirit and scope of the novel concepts of the disclosure.

BRIEF DESCRIPTION OF THE DRAWINGS

FIGS. 9A-9C are graphs showing a correlation between bone quality torque measurement and a maximum torque that may be applied to a helical fastener before stripping of a bone occurs;

DETAILED DESCRIPTION

Figure 1:
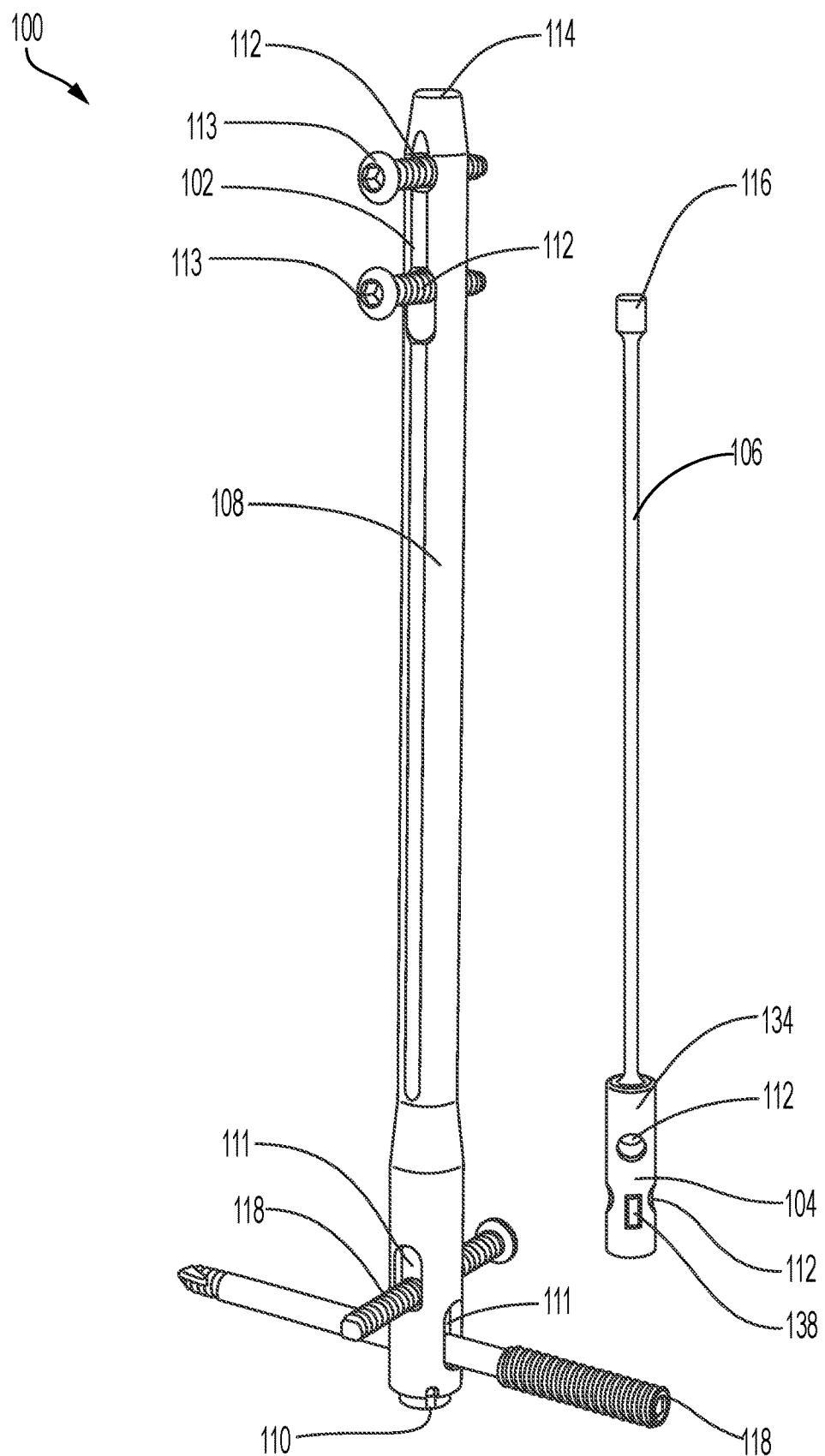
FIG. 1 is a perspective view of one embodiment of bone fusion system in accordance with the principles of this disclosure, showing a contracting element removed from a rigid element.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments.

As used herein, "compression" generally refers to a process of applying compressive forces to two or more bones (e.g., and/or bone fragments) and, thereby, fixate the bones in a desired orientation and promote fusion of the bones via ossification. Previous approaches to compression are typically agnostic as to the composition of bone into which compression devices will be implanted. For example, certain approaches may specify the use of the same model of compression device—which exerts a fixed amount of compressive force—for both a diabetic patient and a non-diabetic patient. The same could be said for a young, healthy athlete who suffers an injury compared to an elderly person suffering from osteoporosis.

In light of the above, a "one size fits all" approach to applying compression to bone fragments has a number of downsides. While the young athlete may tolerate a compression device that exerts relatively high compressive force—thereby enhancing potential fixation and osseointegration—the same compressive force applied to osteoporotic bone would be excessive and result in failure. Put another way, patients having poor bone quality (e.g., below average bone density, bone strength, and other factors) may experience adverse compression outcomes when standard compression devices are utilized due to excessive compressive forces generated thereby.

As a further example, a standard compression device threaded into a patient's bone having below average bone density may malfunction due to excess forces—torque or compression—stripping away bone material along compression device threads. In this example, the compression device may experience pullout—when a threaded portion pulls out of bone without rotating—and, thereby, result in non-fusion, non-union, misalignment, or other undesirable compression outcomes that may adversely affect the health of the patient, introduce additional bone flaws, and/or require revision surgery.

Bone quality varies naturally between subjects and, therefore, each subject may demonstrate a different response when treated with the same level of compression. Further, bone quality can vary between different parts of the same bone (e.g., a first end of a bone may have a different bone quality/density than a second end of the bone). Accordingly, patient outcomes may be improved by calibrating compression, torque, and devices based on the quality of bone into which a corresponding compression device will be inserted. Stated differently, better patient outcomes may be achieved if bone quality/density is measured in-situ at precise locations than via imaging or other whole-bone quality/density measurements.

In one or more embodiments, a compression fixation system includes a bone quality assessment device for measuring bone torque value, a medical device configured to receive one of a selection of contracting elements, with each contracting element providing a different compression force. In one example, the medical device is a dynamic compression bone fixation device, such as, for example, a screw or a nail.

In various embodiments, the first contracting element provides a first level of compressive force and is associated with a first torque value range, and the second contracting element is associated with a second, greater level of compressive force and a second torque value range that is greater than and excludes the first torque value range.

According to one embodiment, a user (e.g., a surgeon or technician) inserts the bone quality assessment device into a bone portion at a target site, measures a minimum torque value for shearing the bone portion via the bone quality assessment device, and determines that the torque value falls within a first torque value range (e.g., indicating that bone quality may be unsuitable for higher force contracting elements).

In one or more embodiments, based on the determination, the user selects the first contracting element, configures the first contracting element within the medical device such that the compression is held in a first, non-compressive state, and inserts the medical device into the target site.

Following insertion, the user may engage the medical device by allowing the first contracting element to transition to a second, compressive state in which the first contracting element applies dynamic compression to two or more bone portions at the target site.

Figure 2:
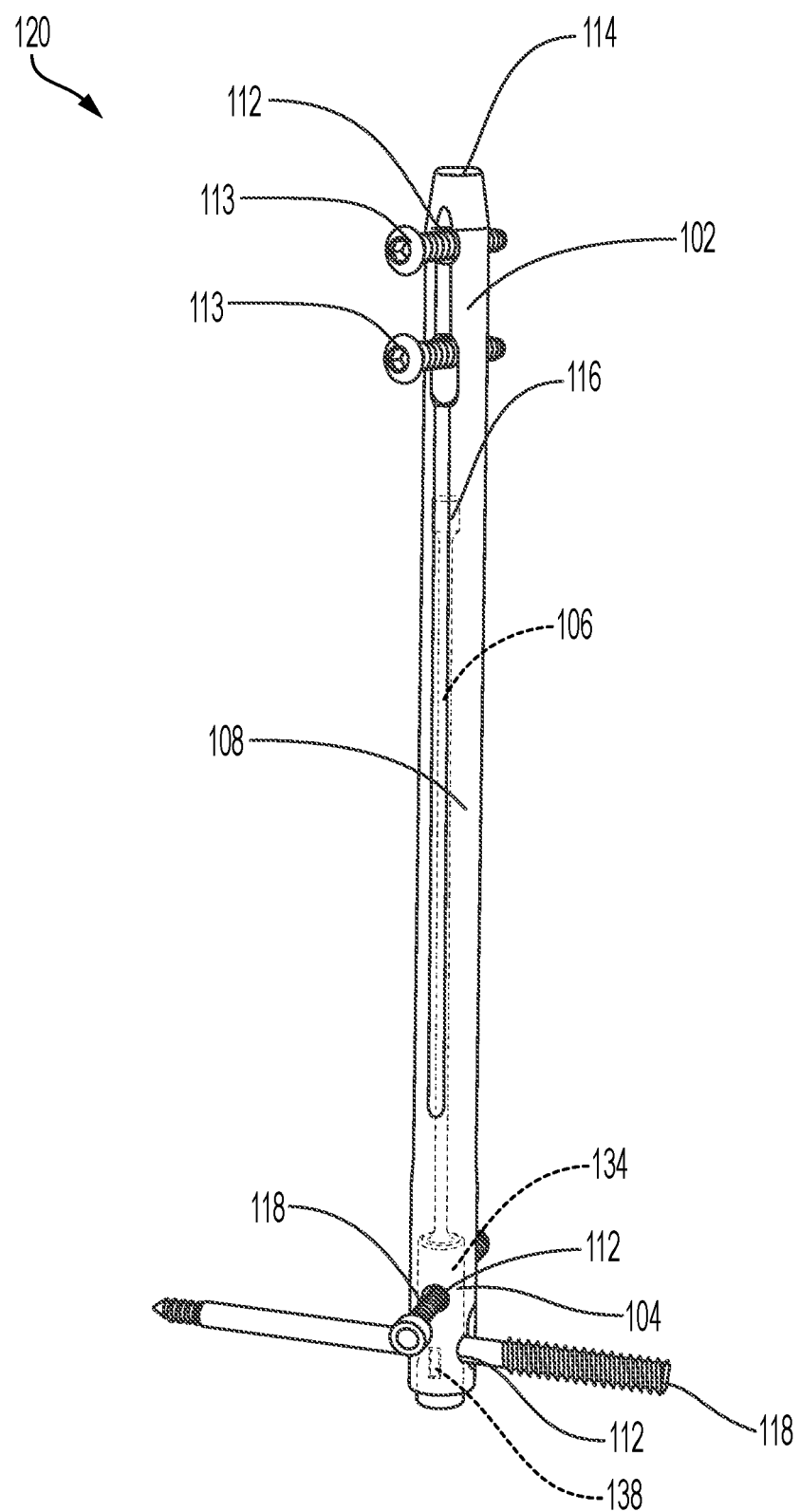
FIG. 2 is another perspective view of the bone fusion system of FIG. 1, showing the medical device in a fully assembled configuration.

FIGS. 1-2 show one embodiment of a medical device 100 in accordance with the principles of this disclosure (which may be an intramedullary medical device). The medical device 100 shown is used in tibiotalocalcaneal (TCC) fusion surgery, which is performed to relieve pain and correct severe foot deformity by fusing a patient's ankle bones.

The embodiment shown includes a proximal anchor element 102, a distal anchor element 104, a contracting element 106 which connects the anchors, and a rigid element 108 between the anchors which slidably couples the anchors. Each element is discussed further below.

Rigid element 108 may slidably connect the proximal anchor element 102 and the distal anchor element 104. In the embodiment shown, the rigid element 108 is a tube-like structure that provides resistance to both torsional and bending stresses.

The rigid element 108 is shown enclosing the distal anchor element 104, limiting movement of the distal anchor element to axial movement with respect to the rigid element. For example, the rigid element 108 and the distal anchor element 104 may be mated and/or slidably coupled, as described further below, such that the distal anchor element may move axially with respect to the rigid element, but may not move torsionally and/or bend (e.g., deform out of axis) with respect to the rigid element.

In the embodiment shown, the proximal anchor element 102 is integrally formed with the rigid element 108. The proximal anchor element 102 may alternatively be attached to the rigid element 108. For example, the proximal anchor element 102 and the rigid element 108 may be portions of a single element. In another embodiment, the proximal anchor element 102 may be separated from the rigid element 108 or connected with the rigid element through a flexible interconnect.

A contracting element 106 is shown linking the distal anchor element 104 and the proximal anchor element 102. The contracting element 106 may be strained (e.g., stretched toward open end 110 of the rigid element) through sliding the distal anchor element 104. Thereby, the distal anchor element 104 may slide relative to the proximal anchor element 102 and the rigid element 108.

In one embodiment, the contracting element 106 and the distal anchor element 104 are elements which may be connected. In another embodiment, the contracting element 106 and the distal anchor element 104 are both made from a single piece of material.

In the embodiment shown, contracting element 106 may generate compressive forces when tension is applied to the contracting element, not unlike the function of an extension spring. In certain alternative embodiments, contracting element 106 may be replaced by other suitable mechanical elements for generating compressive forces (e.g., springs, gears, etc.).

In yet additional embodiments, medical device 100 may include any suitable combination of shape memory material and mechanical elements may be used without departing from the principles of this disclosure. Further, the medical device 100 discussed herein may include devices that are activated or engaged to apply compression following insertion to a target site and devices that actively apply compression during and after target site insertion.

In certain embodiments, contracting element 106 may be pre-tensioned prior to surgery. In alternative embodiments, contracting element 106 may be tensioned during surgery.

As shown, rigid element 108 has slots 111 disposed allowing anchor holes 112 of the distal anchor element 104—shown here with fasteners 113 inserted into the anchor holes—to be accessed while the distal anchor element may slide relative to the rigid element. For example, the slots 111 may allow a bone anchor 118 (e.g., bone screw, calcaneal screw, bone pin, rod) to pass through the rigid element 108 without causing interactions between the bone anchor and the rigid element that would significantly axially limit the sliding of the distal anchor element 104 relative to the rigid element.

The slots 111 may be designed to guide axial travel of the bone anchor while it is coupled with the distal anchor element. In the embodiment shown, the slots 111 are shown large enough for the distal anchor element 104 to be slid axially. For example, the slot 111 may guide the bone interface device to travel axially, while limiting torsional movement of the bone interface device.

The proximal anchor element 102 and distal anchor element 104 may comprise a material selected for interfacing with a bone anchor. The material of the proximal anchor element 102 may be different than the material of the rigid element 108. Similarly, the material of the distal anchor element 104 may be different from the material of the contracting element 106. Each material may be selected for different properties (e.g., properties adapted for holding a screw rather than properties for contracting and/or properties for compliance along an axis).

FIG. 2 shows an embodiment of a proximal anchor element 102 attached to a rigid element 108 of a medical device. In the embodiment shown, the rigid element 108 is shown generally as a tube by way of example.

Other embodiments may be adapted and used wherein the rigid element 108 is a sleeve of arbitrary cross-section. For example, the rigid element 108 may be a sleeve with a rectangular cross section, or a star-patterned cross-section. As further examples, the sleeve may have a cross section that may include ridges, channels, solid regions and/or voids. The cross section of the sleeve may be adapted to achieve certain torsional resistance and/or bending resistance characteristics. In other embodiments, the sleeve structure may be replaced or buttressed by a rib, strut, and/or crutch structure. Further embodiments of rigid elements are described further below.

In the embodiment shown, the proximal anchor element 102 has a cylindrical shape with radial anchor holes 112 (e.g., perpendicular to the cylinder). In some embodiments, the end 114 of the proximal anchor element is pointed to ease insertion into a bone cavity that has been prepared in the patient's tibia. The end 114 of the proximal anchor element 102 may be shaped to ease insertion, to optimize structural strength of the proximal anchor element, and/or to benefit interaction between the medical device 100 and the patient. In certain embodiments, proximal anchor element 102 may include helical threads, replacing anchor holes 112 and fasteners 113. In such embodiments, rigid element 108 is inserted into the bone and rotated, causing the helical threads to engage the bone and anchor the rigid element therein.

In the embodiment shown, the proximal anchor element 102 is attached to the rigid element 108 to form a single element 120. In another embodiment, the proximal anchor element 102 is formed together with the rigid element 108 to form a single element 120. The single element 120 as shown includes closed end 114 formed by the proximal anchor element 102, and an open end 110, as further described herein. Also shown and described further herein are slots 111 in the rigid element 108.

As shown, contracting element 106 may comprise shape memory material (SMM) (e.g., nitinol, elastics, etc.). In the embodiment shown, the contracting element 106 includes a rod of SMM. In another embodiment the contracting element 106 includes a plurality of rods of SMM. As used herein, the term "rod" is used to describe an elongate element, which may be cylindrical and may be solid.

In another embodiment, described further below, contracting element 106 is a tube of SMM with slots and/or voids placed in the tube. In yet another embodiment, the contracting element 106 includes a combination of rods and tubes. Other embodiments of contracting elements 106 may alternatively be used, including other structures and/or other materials, such as linear springs, non-linear springs, and composite structures.

Contracting element 106 provides axial compliance between a proximal anchor element and a distal anchor element of a medical device. As used herein, "axial compliance" refers to the capability of achieving greater than about one percent (1%) strain without plastic deformation.

As used herein, "plastic deformation" refers to strain that is unrecoverable (or not otherwise recoverable under anticipated in-vivo conditions) in the absence of stress.

The SMM may be used as a contracting element 106 through straining the SMM into a pseudo-elastic state. The SMM may be treated to enhance the pseudo-elastic properties of the alloy. The pseudo-elastic properties of an SMM may be determined to start occurring at a nonlinear transition in a stress-strain curve of the shape memory alloy. In practice, this nonlinear transition may occur between about one percent (1%) and about six percent (6%) axial strain. Other nonlinear transition regions may be developed through, for example, treatments to the SMM before, during, and/or after straining.

Contracting element 106 includes locking features that engage with the other elements of the medical device 100. For example, the contracting element 106 and other elements of the medical device 100 may interface through a locking system of threads, cams, posts, extensions, slots, channels and/or guides. A locking system can provide the ability for one of the elements to rotate with respect to another element during assembly, and may resist the opposite rotation (e.g., including disassembly) in an opposite direction after such assembly. It should be understood that the above discussion of threads is another example of a locking system which allows rotation in one direction during assembly, and resists counter rotation (and hence, disassembly) after such assembly.

In other embodiments, an expanding element may be substituted for the contracting element 106. For example, the expanding element may be configured within the rigid element to cause the proximal anchor element and distal anchor element to compress the bones of the tibia, talus, and calcaneus. For example, the expanding element can "push" the distal anchor element axially with respect to the rigid element via a suitable interior configuration of the expanding element, as well as the proximal anchor element, the rigid element, and the distal anchor element.

The distal anchor element 104 includes at least one anchor hole 112. In the embodiment shown, the distal anchor element 104 is adapted to fit within the rigid element 108, as described further herein. The distal anchor element 104 may contact the rigid element 108 along some or all of an outer rounded surface 134 of the distal anchor element. In the embodiment shown, the distal anchor element 104 contacts the rigid element 108 along substantially all of the outer rounded surface 134 of the distal anchor element. In another embodiment, the distal anchor element 104 extends beyond the rigid element 108. For example, in certain embodiments, a significant portion of the distal anchor element 104 is outside the rigid element 108.

Guiding and/or locking elements 138 may be included on a distal anchor element 104 which can selectively engage with rigid element 108 to limit torsional movement of the distal anchor element with respect to the rigid element. In certain embodiments, the guiding/locking elements 138 may interface the distal anchor element 104 and the rigid element 108 through a mating of ridges and channels. For example, the distal anchor element 104 may have a guiding/locking element 138 comprising a ridge which mates with a channel in the rigid element 108, thereby allowing axial movement and limiting torsional movement of the distal anchor element. As another example, the distal anchor element 104 may have a channel which selectively engages a ridge in the tube, thereby allowing axial movement and limiting torsional movement.

The guiding/locking elements 138 of the distal anchor element 104 may slidably interconnect with the rigid element 108. The guiding/locking elements 138 may allow relative movement axially between the rigid element 108 and the distal anchor element 104. The guiding/locking elements 138 may prevent torsional movement between the rigid element 108 and the distal anchor element 104.

Medical device 100 is described herein as an example of a dynamic compression fixation device, but alternative devices may be used without departing from the principles of this disclosure. In certain embodiments, one or more elements of a medical device may bend or curve to accommodate certain anatomies. For example, rigid elements described herein may be adapted to particular applications through being curved (e.g., fusing a joint in a curved position).

Additionally, elements of a medical device as described herein may be rearranged and/or modified. For example, an anchor element may be expanded or reduced in size as appropriate for a particular bone. As another example, a curvature may be introduced into an element, such as a rigid element. A compressive element may be placed in a straight or curved portion of a medical device. Interconnections of the elements as described herein (e.g., slidable interconnections, threads) may be positioned according to any rearrangement, and/or modification of the elements without departing from the principles of this disclosure.

As will be understood from discussions herein, any suitable active or passive compression device might be used with the techniques, devices, and methods described herein. Two examples of such compression devices are disclosed in U.S. Pat. Nos. 8,491,583 and 11,291,488, the disclosures of which are hereby incorporated by reference for all purposes.

In various embodiments, calibrating compression based on bone quality includes the steps of: (1) measuring one or more properties of bone material at a target site into which a medical device will be inserted, and (2) selecting a medical device (e.g., or a contracting element thereof) based on the one or more bone properties. In one or more embodiments, a bone quality assessment device 300 (see FIGS. 6-8)—similar to a punch cutter or other bladed tool—is used to collect mechanical performance data (the "bone quality data").

In certain embodiments, the bone quality data is the torque necessary to cut into the bone—which may be indicative of bone quality at the target site. In various embodiments, the bone quality data correlates to a maximum level of torque that may be applied to a helical element inserted into the bone and/or a maximum level of compression that may be applied to the bone at a target site without causing destruction or degradation of the bone. For example, the bone quality data is correlated to a maximum level of torque that may be used to secure a medical device before causing shearing of bone along threaded sections of the securing fasteners or the medical device itself—which may cause device pullout and other complications. In the same example, the bone quality data is correlated to a maximum level of compression that a dynamic contracting element may deliver to a target site following insertion of the medical device.

In some embodiments, a compression fixation system includes a bone quality assessment device 300 and at least a first medical device and a second medical device (e.g., though any number of force-variant medical devices and/or contracting elements is contemplated). According to one embodiment, the first compression device can apply a first level of compressive force and is associated with a first torque value range, and the second compression device can apply a second, greater level of compressive force and is associated with a second torque value range that is greater than and excludes the first torque value range. In one or more embodiments, a user may select one of the two compression devices based on a minimum torque value required by the bone quality assessment device 300 to shear bone at a target site. In addition to the application of bone quality assessment device 300 described herein, the bone quality assessment device could be used in a wide variety of surgical procedures without departing from the principles of this disclosure. Indeed, bone quality assessment device 300 could be used in any situation where it is desirable to attach hardware to bone (e.g., using helical fasteners or otherwise) or where pushout force is a concern. Some examples of such hardware include, but are not limited to, POGO screws, bone fixation plates, joint replacement implants and related hardware.

Figure 3:
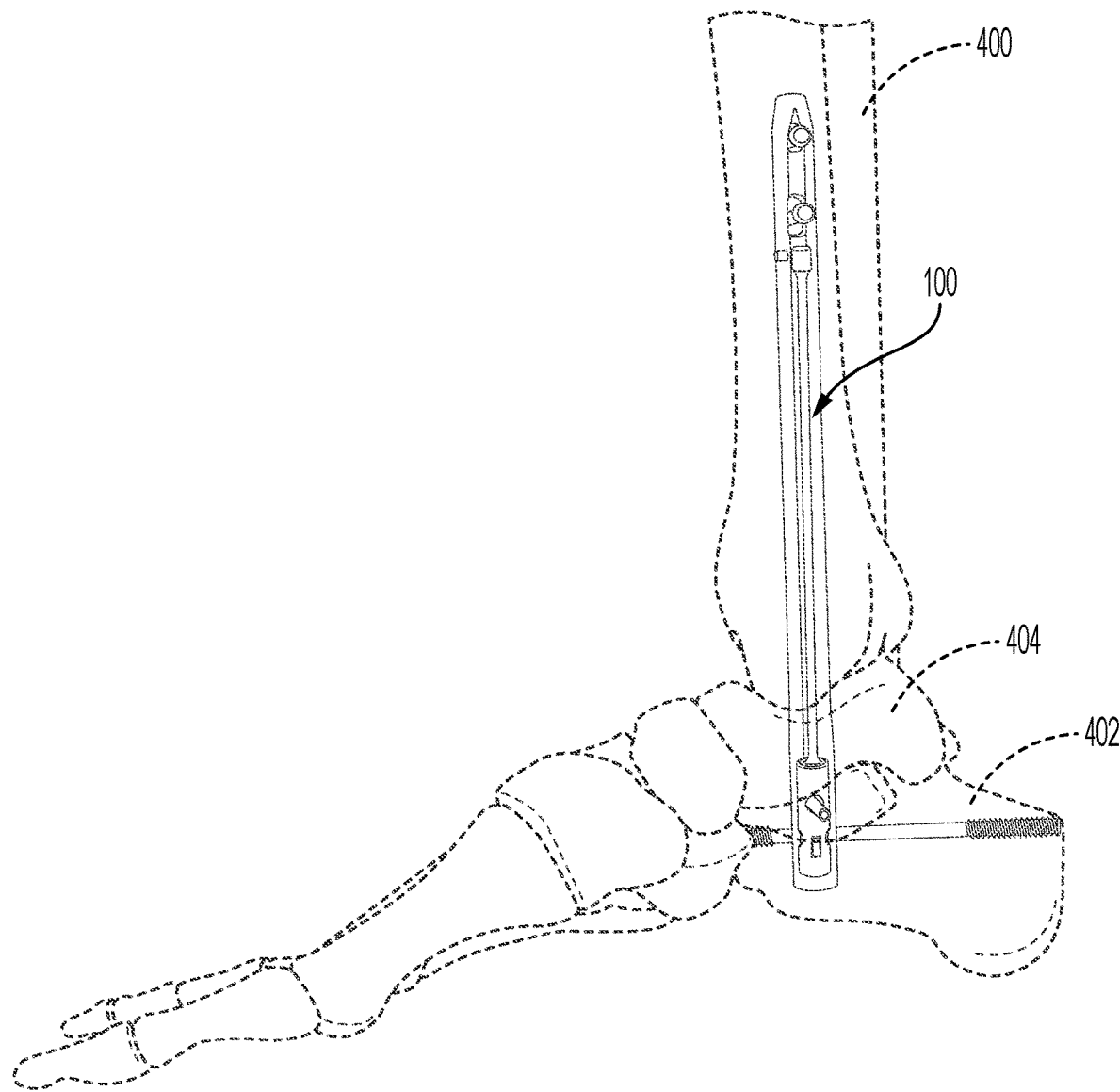
FIG. 3 is a side schematic view of the bone fusion system of FIG. 1, showing the bone fusion system installed in an ankle.

FIG. 3 shows the positioning of medical device 100 in a patient's ankle after TCC fusion surgery has been completed. As shown, contracting element 106 is in its stretched position. Medical device 100 described above is inserted into the tibia 400—the tibial medullary canal, in particular—after passing through the calcaneus 402 and talus 404. Once inserted and secured, medical device 100 compresses the calcaneus 402, talus 404, and tibia 400 together, thereby fusing the ankle joint.

Figure 4:
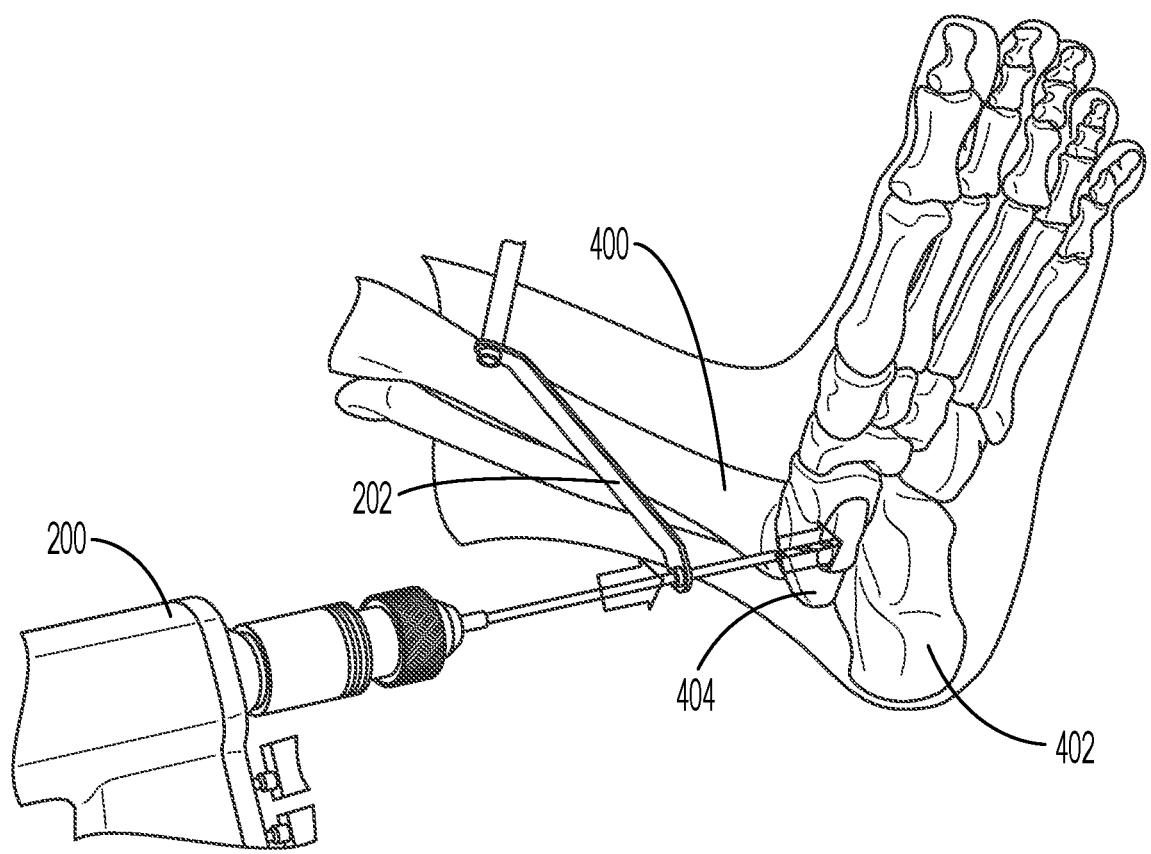
FIG. 4 is a perspective view of a human foot and ankle, showing a Steinmann Pin used to provisionally fixate bones in the ankle prior to a fusion procedure.
Figure 5:
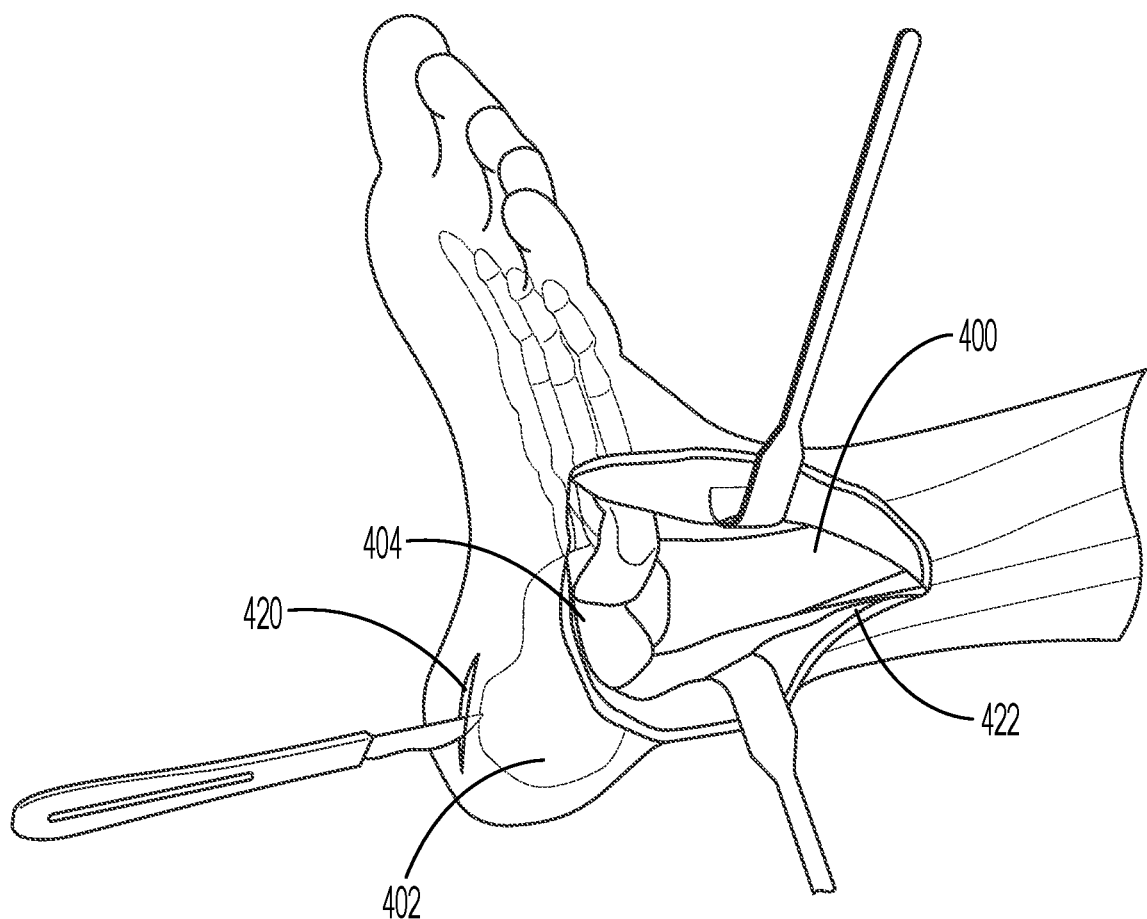
FIG. 5 is a perspective view of a human foot and ankle, showing how a surgeon may access bone fragments in the ankle during fusion surgery.

Turning now to FIGS. 4-5, schematic views showing how a surgeon gains access to a bone prior to performing TCC fusion surgery are shown. FIG. 4 shows one surgical approach for positioning the patient in preparation for TCC surgery. In the embodiment shown, a 2.5 mm Fenestration Drill 200 with the 2.5 mm end of the 2.5 mm/4 mm Drill Guide 202 may be used to aid in creating viable bleeding bone or feathering the joint surfaces. Of course, alternative drills or guides may be used without departing from the principles of this disclosure. If any significant bone gaps are noted, they may be filled with bone autograft, allograft, or other suitable material per surgeon preference. The surgeon continues joint preparation until good bone-to-bone apposition is achieved. Next, provisional fixation with smooth Steinmann Pins or other provisional fixation tool (not shown) may be used to maintain the desired alignment. In certain embodiments, a kit for performing fixation surgery may include medical device 100, a selection of contracting elements 106 of varying compression strengths, a Fenestration Drill 200, a Drill Guide 202, and a bone quality assessment device 300. In further embodiments, a kit includes any combination of devices, instruments, equipment, and/or devices for accomplishing the techniques described herein.

As shown in FIG. 5, the surgeon may prep the medical device 100 site by making a plantar incision 420 and another incision 422 along the side of the ankle joint, thereby exposing the tibia 400, calcaneus 402, and talus 404.

Figure 6:
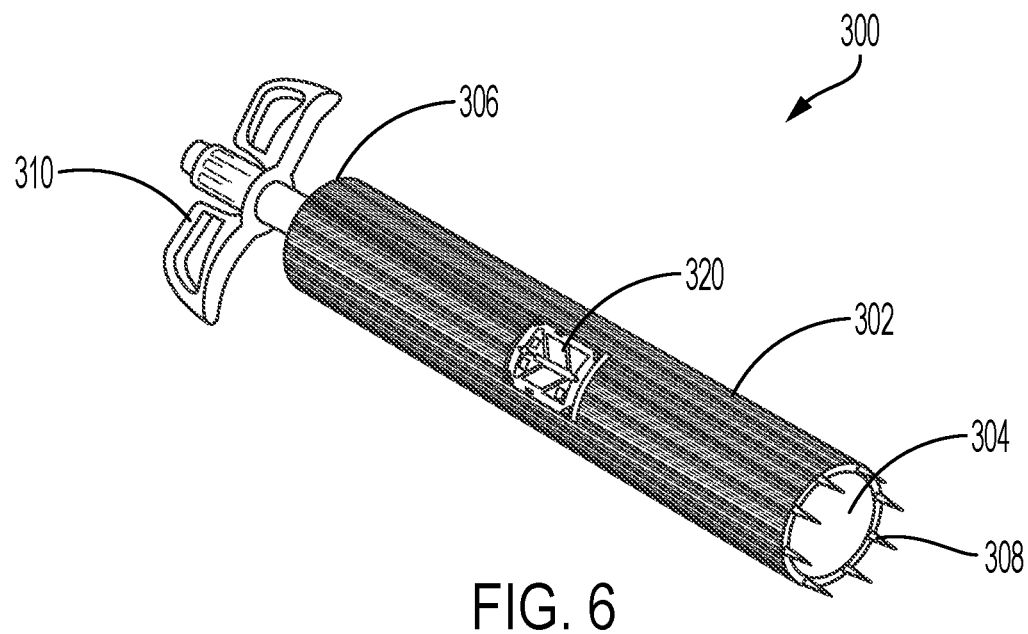
FIG. 6 is a perspective view of one embodiment of a bone quality assessment device including a strain gauge in accordance with the principles of this disclosure, showing the bone quality assessment device in an un-torqued position.
Figure 7:
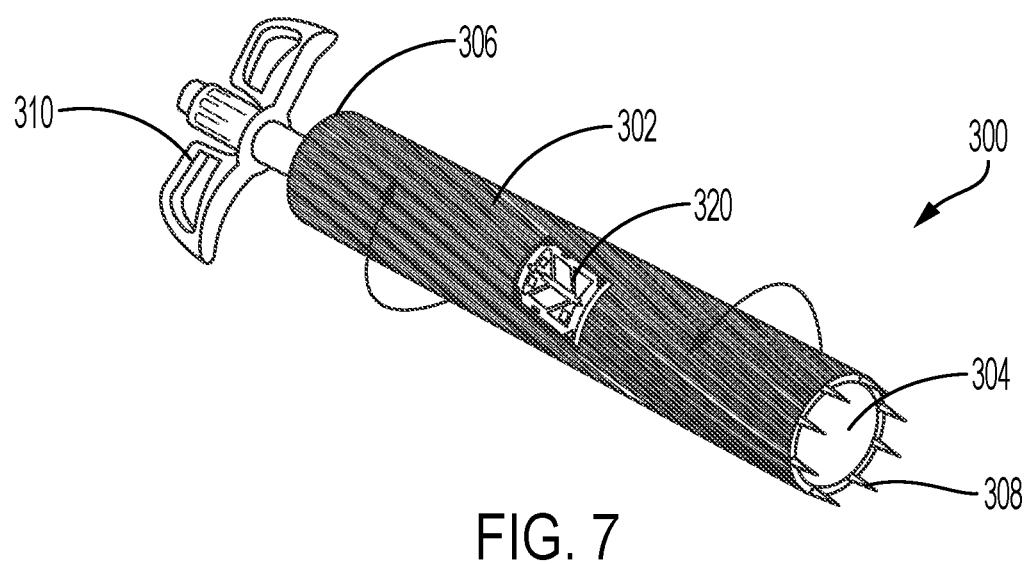
FIG. 7 is another perspective view of the bone quality assessment device of FIG. 6, showing the bone quality assessment device in a torqued position.

Turning now to FIGS. 6-7, one embodiment of a bone quality assessment device 300 is shown in accordance with the principles of this disclosure. As shown, bone quality assessment device 300 includes a hollow shaft 302 having a first end 304 and a second end 306. In certain embodiments, shaft 302 may be solid, rather than hollow without departing from the principles of this disclosure.

A plurality of teeth 308 are disposed at the first end 304 and a handle 310 is disposed at the second end 306. In certain embodiments, handle 310 may be integrally formed with shaft 302. In certain alternative embodiments, handle 310 may be a separate part that is attached to shaft 302. In certain embodiments, the plurality of teeth 308 are integrally formed with shaft 302.

In the embodiment shown, a sensor 320 is connected to the bone quality assessment device 300 and measures the value of torque applied to the target site throughout rotation of the bone quality assessment device and, in particular, at the instance of bone shearing. In the embodiment shown, the sensor 320 is a strain gauge that is affixed to a body of the bone quality assessment device 300, and when the bone quality assessment device is inserted into bone and an increasing torque is applied to the bone quality assessment device, the sensor measures the torque necessary to cause the bone to shear.

In this example, the value of torque that initiated bone shearing is used to determine a maximum insertion torque for securing a medical device to the target site and a maximum compression force that the medical device may safely apply to the target site.

In certain embodiments, sensor 320 may be a mechanical torque gauge or any other suitable mechanism for measuring torque without departing from the principles of this disclosure.

Figure 8:
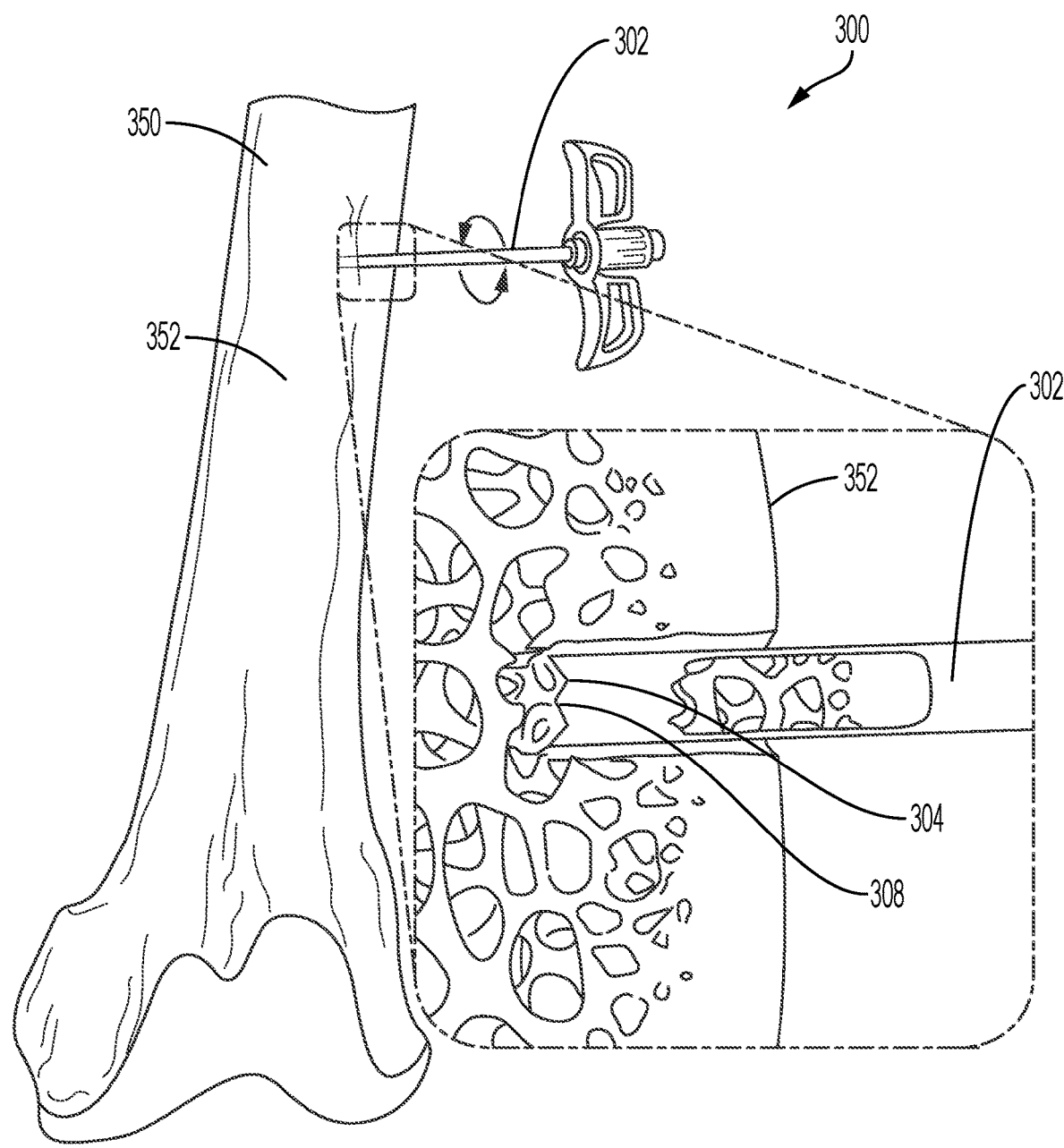
FIG. 8 is a schematic view of a bone, showing how the bone quality assessment device of FIG. 6 may be used to measure bone quality.

Turning now to FIG. 8, a schematic view of bone quality assessment device 300 being used to assess bone quality is shown. In the embodiment shown, bone quality assessment device 300 is inserted into a bone 350 until the plurality of teeth 308 engages outer surface 352 of bone 350. Next, a torque is applied to handle 310 until the bone quality assessment device 300 turns and the teeth 308 shear the bone 350.

In certain embodiments, a torque value (e.g., and/or other bone quality data) is used to select a particular contracting element from a plurality of contracting elements, each element being configured to provide a particular level of compressive force (e.g., when installed in a medical device, inserted to a target site, and engaged to apply compressive forces thereto). Bone quality assessment device 300 or other handheld tool for measuring bone quality may be more practical for evaluating bone quality at a specific target site as compared to other techniques that measure whole-bone properties, such as, for example, computed tomography scans. Furthermore, measuring bone quality using bone quality assessment device 300 may allow users to avoid disturbing healthy bone stock by limiting reduction to a particular target site of a bone portion. In some embodiments, bone quality assessment device 300 may be inserted to a target site via a k-wire or other guidewire, thereby allowing for measurement at any depth.

As will be understood from discussions herein, the bone quality assessment device 300 may include features not shown in the figures. For example, the bone quality assessment device 300 may include blades, like those of a punch cutter (instead of teeth). In other examples, the bone quality assessment device 300 may include spikes, pins, or other mechanisms (analog or digital) that measure bone quality/density in-situ.

FIGS. 9-12 are graphs showing how the torque value necessary to shear bone using bone quality assessment device 300 is correlated to bone quality, helix maximum torque and pushout force. FIGS. 9A and 9B show that there is an exponential relationship between the torque measured by bone quality assessment device 300, the maximum torque that may be applied by a helical element—such as bone anchor 118 or any other suitable screw device—and the density of a block of bone simulation material. FIG. 9A shows the relationship between bone quality torque and bone simulation material density, i.e., how much torque is needed to shear the bone simulation material. FIG. 9B shows the relationship between maximum helical torque that can be applied to a helical fastener into bone simulation material before the bone simulation material breaks down. FIG. 9C combines the results of FIGS. 9A and 9B shows the linear relationship of the torque curve of the bone quality assessment device readings and the maximum torque readings obtained through testing. As such, a correlation between bone quality data—the bone quality torque measurement—and the maximum helical torque can be made.

Figure 10:
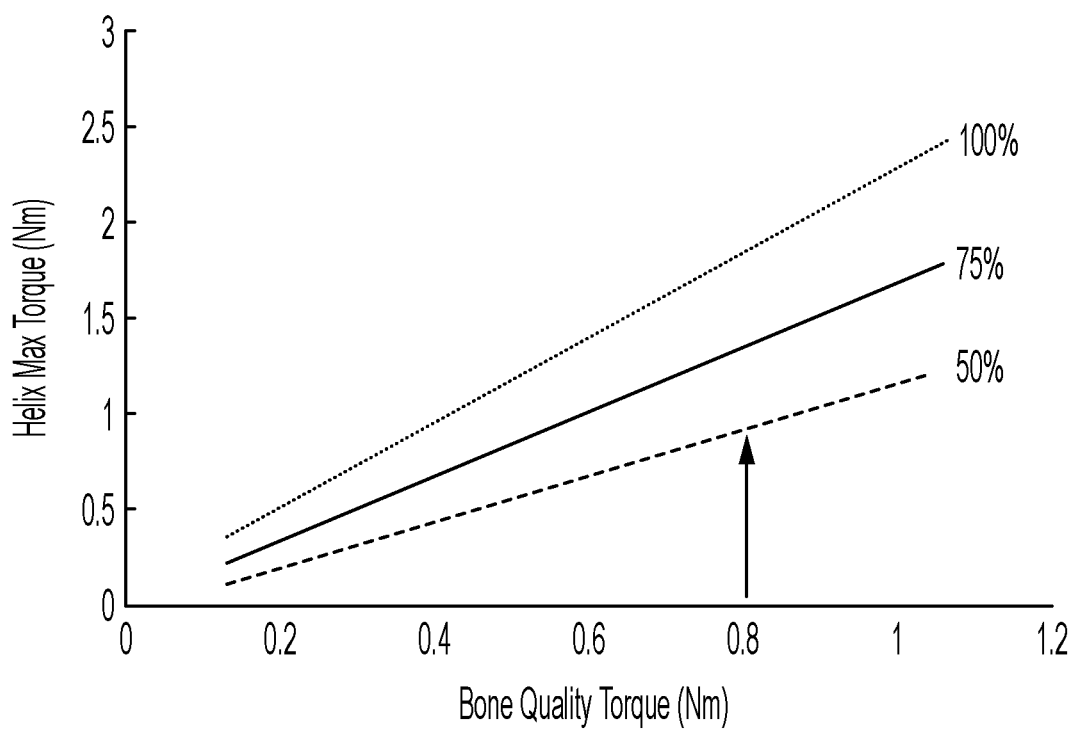
FIG. 10 is a graph showing a relationship between helix maximum torque and bone quality torque.

FIG. 10 is the same as FIG. 9C, except it shows helix torque values of 75% and 50% of the maximum torque in addition to the maximum torque line in FIG. 9C. In practice, it may not be desirable to apply the maximum allowable torque—based on the bone quality value obtained from a bone quality assessment device—to a helical element. Rather, a user may choose to apply a torque to a helical fastener that is well below—between 50-75%—the maximum torque value. By applying less than the maximum allowable torque to a helical element, the user further protects against potential stripping of the bone into which the helical element is being inserted.

Figure 11A:
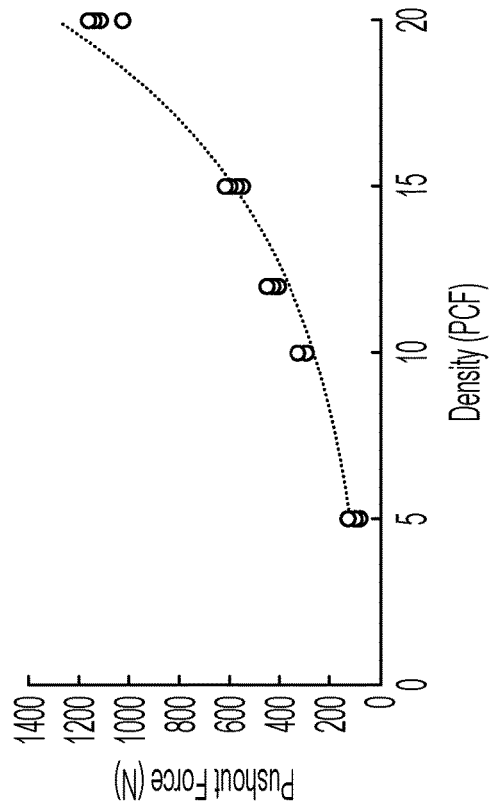
FIG. 11A-11C are graphs showing a correlation between bone quality torque measurement and a maximum pushout force that a medical device can withstand before it will be pushed out of a bone.
Figure 11B:
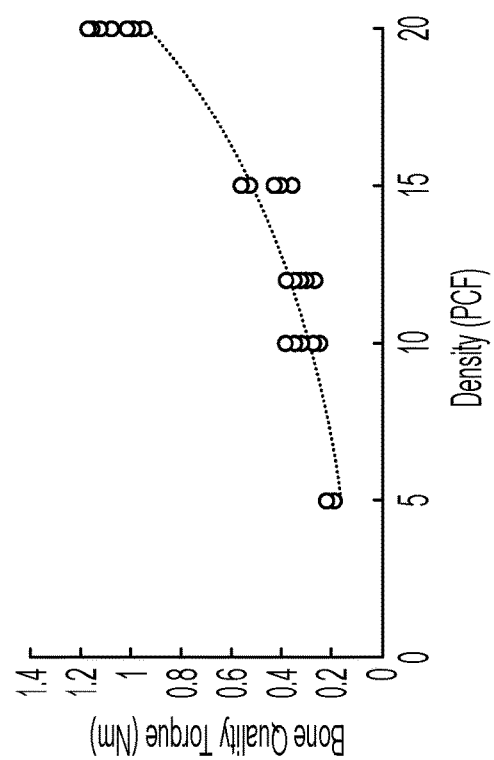
Figure 11C:
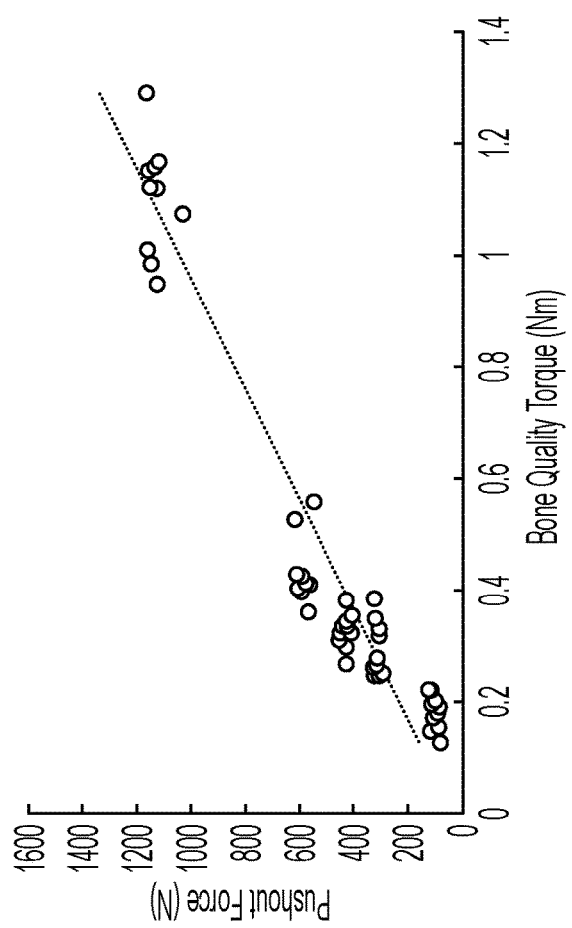
Figure 12:
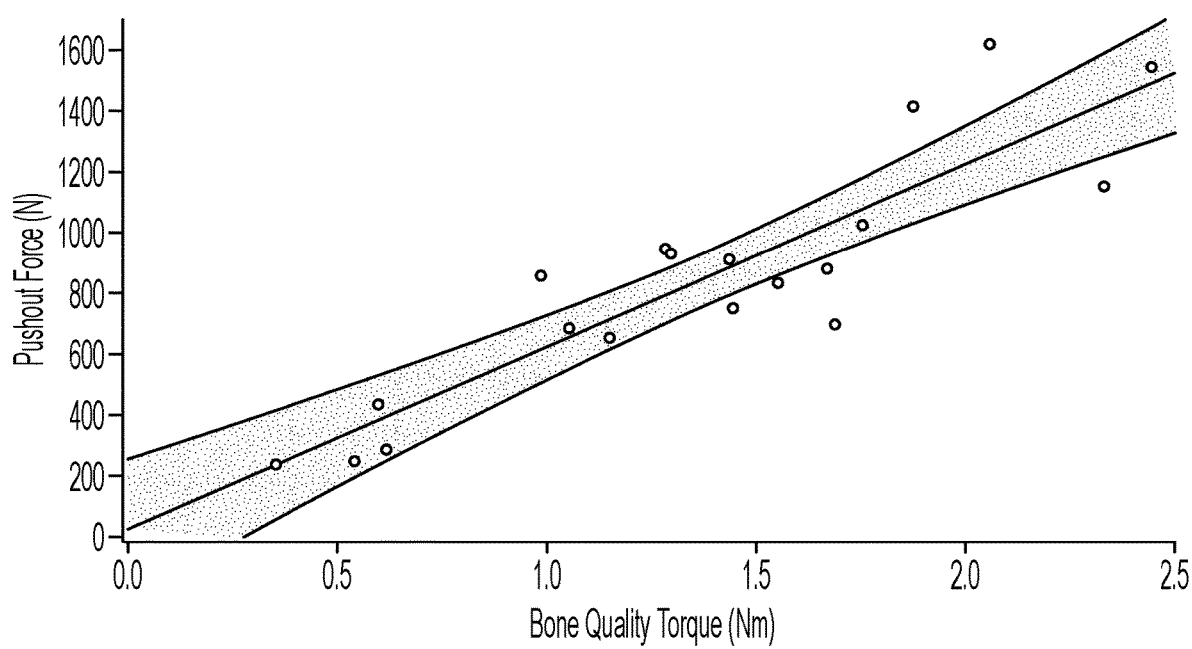
FIG. 12 is a graph showing a relationship between maximum pushout force and bone quality torque.

FIGS. 11A and 11B show that there is also an exponential relationship between the torque measured by bone quality assessment device 300, the maximum pushout force that the bone can withstand, and the density of a block of bone simulation material. FIG. 11C and FIG. 12 combine the results of FIGS. 11A and 11B and shows a linear relationship of the torque curve of the bone quality assessment device readings and the maximum pushout force readings obtained through testing. As such, a correlation between bone quality data—the bone quality torque measurement—and the maximum pushout force can be made. Using the maximum pushout force information, the proper amount of compression force can be applied by a medical device using one of a selection of contracting elements as described above. Like the torque value discussion above, it is desirable to choose a compression force that is less than the maximum pushout force the bone can withstand. In certain embodiments, the compression force applied should be between approximately 95% and 60% of the maximum pushout force.

Figure 13:
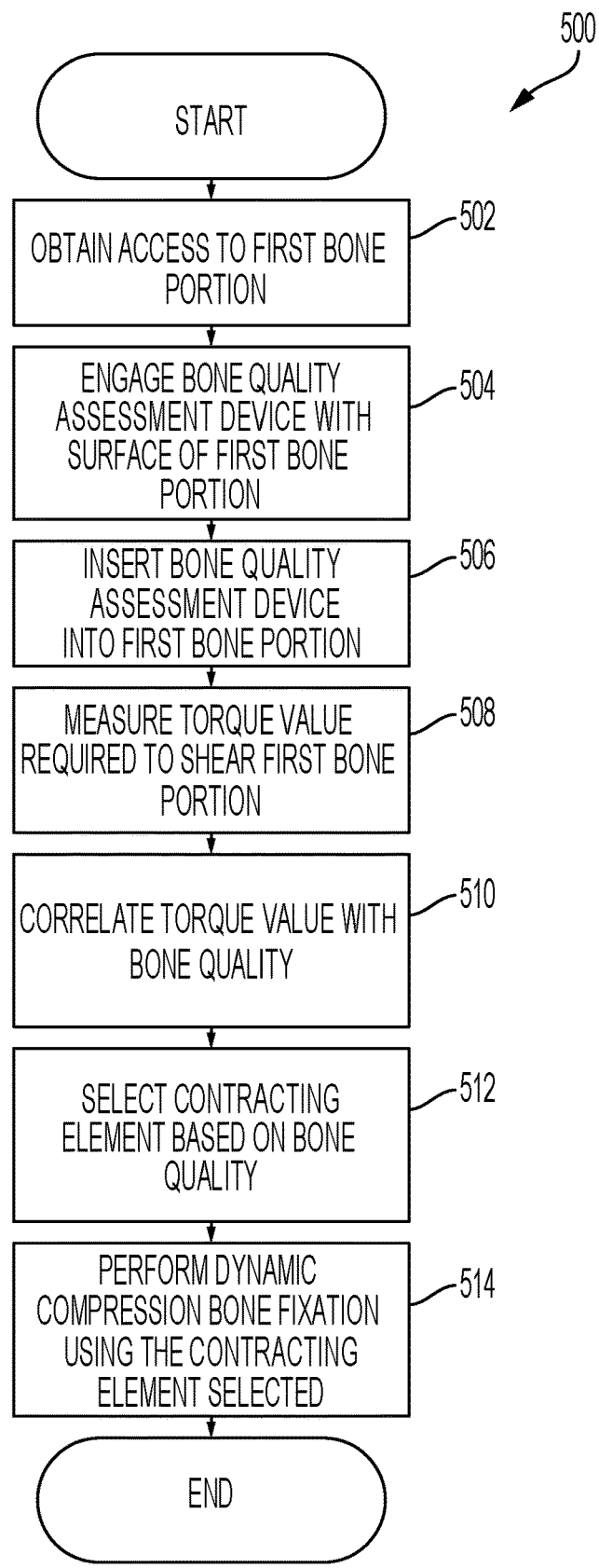
FIG. 13 is a flowchart showing one embodiment of a method for selecting a contracting element based on bone quality measurement in accordance with the principles of this disclosure.

Turning now to FIG. 13, one embodiment of a method of selecting a contracting element using bone quality measurements 500 in accordance with the principles of this disclosure is shown. First, access to a first bone portion is obtained at step 502. Next, at step 504, a bone quality assessment device is engaged with the surface of the first bone portion. Then, at step 506, the bone quality assessment device is inserted into the first bone portion. Next, at step 508, a torque value required to shear the first bone portion is measured. Once the torque value is measured, it is correlated with a bone quality value at step 510. Next, at step 512 a contracting element is selected based on the bone quality value. Finally, at step 514, dynamic compression bone fixation is achieved using the contracting element selected at step 512.

Figure 14:
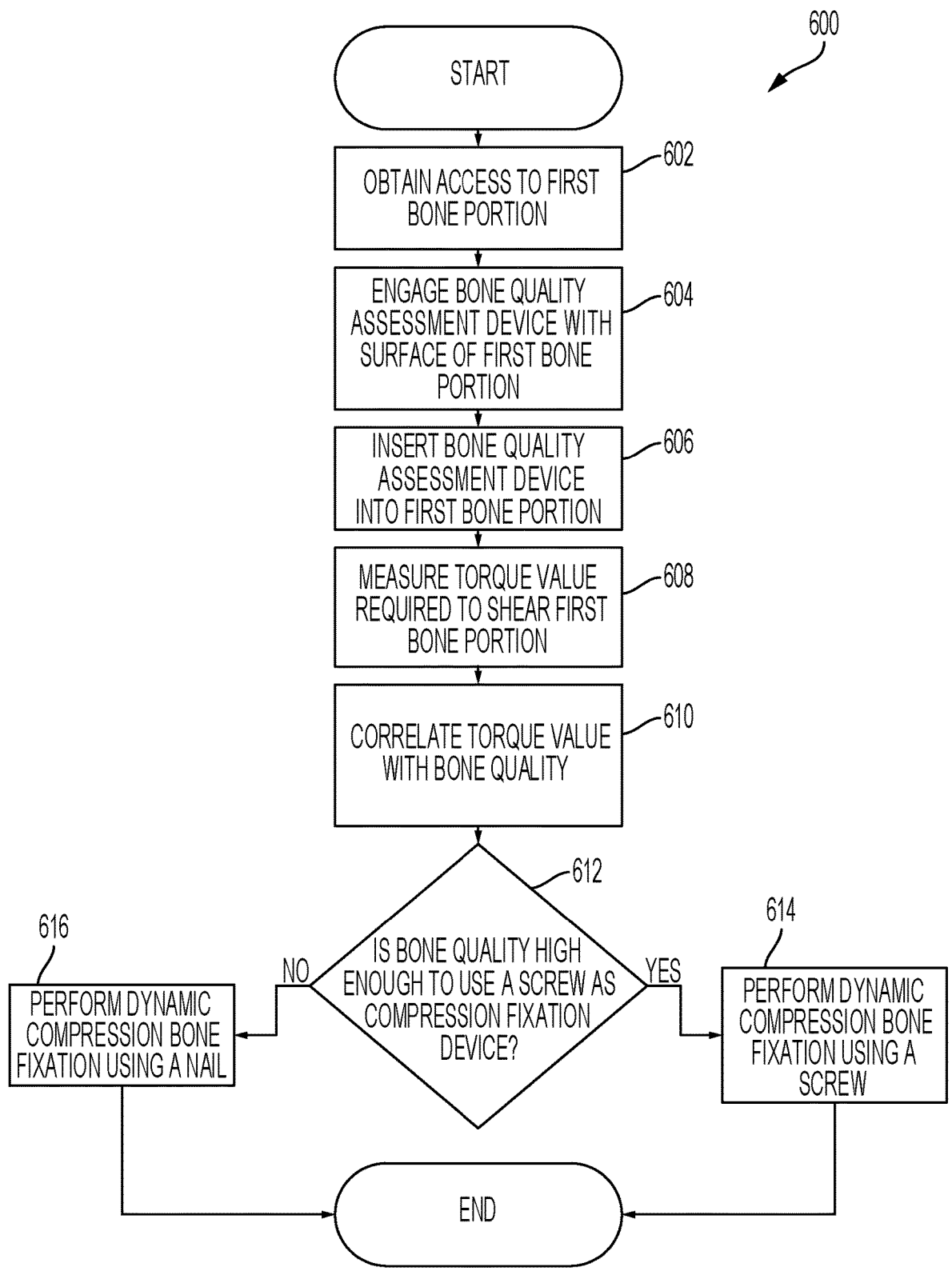
FIG. 14 is another flowchart showing one embodiment of a method for selecting a contracting element based on bone quality measurement in accordance with the principles of this disclosure.

Turning now to FIG. 14, one embodiment of a method of selecting an appropriate compression fixation device using bone quality measurements 600 and accordance with the principles of this disclosure is shown. First access to a first bone portion is obtained at step 602. Next, at step 604, a bone quality assessment device is engaged with the surface of the first bone portion. Then, at step 606, the bone quality assessment device is inserted into the first bone portion. Next, at step 608, a torque value required to shear the first bone portion is measured. Once the torque value is measured, it is correlated with a bone quality value at step 610. Next, at step 612, a decision is made regarding whether the bone quality is high enough to use a screw as a compression fixation device. If the bone quality is high enough to use a screw as a compression fixation device, a dynamic compression bone fixation is performed using a screw at step 614, such as, for example, but not limited to, the screw device discussed in U.S. Pat. No. 11,291,488, incorporated by reference herein. If the bone quality is not high enough to use a screw as a compression fixation device, a dynamic compression bone fixation is performed using a nail at step 616.

Figure 15:
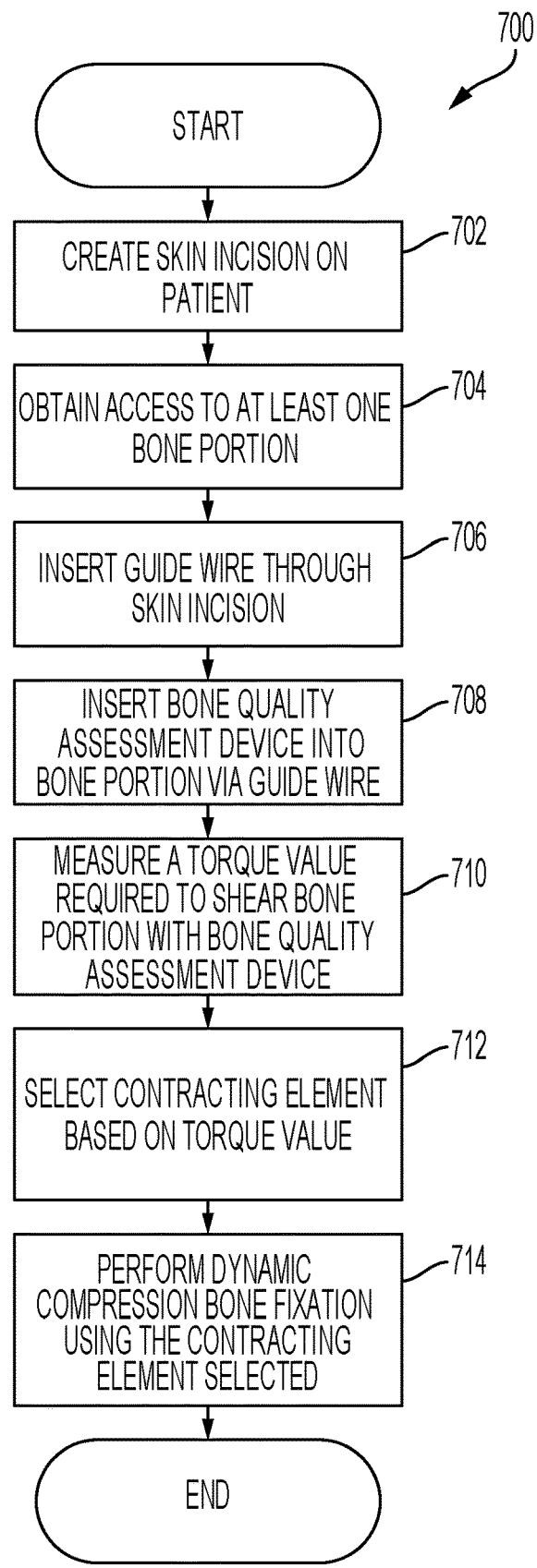
FIG. 15 is another flowchart showing one embodiment of a method for selecting a contracting element based on bone quality measurement in accordance with the principles of this disclosure.

Turning now to FIG. 15, another embodiment of a method of selecting a contracting element using bone quality measurements 700 in accordance with the principles of this disclosure is shown. First, at step 702, a skin incision is made on a patient. Next, access to a first bone portion is obtained 704. Next, at step 706, a guide wire is inserted through the skin incision made in step 702. Then, at step 708, the bone quality assessment device is inserted into the first bone portion via the guide wire. Next, at step 710, a torque value required to shear the first bone portion is measured. Next, at step 712 a contracting element is selected based on the torque value. Finally, at step 714, dynamic compression bone fixation is achieved using the contracting element selected at step 712.

Figure 16:
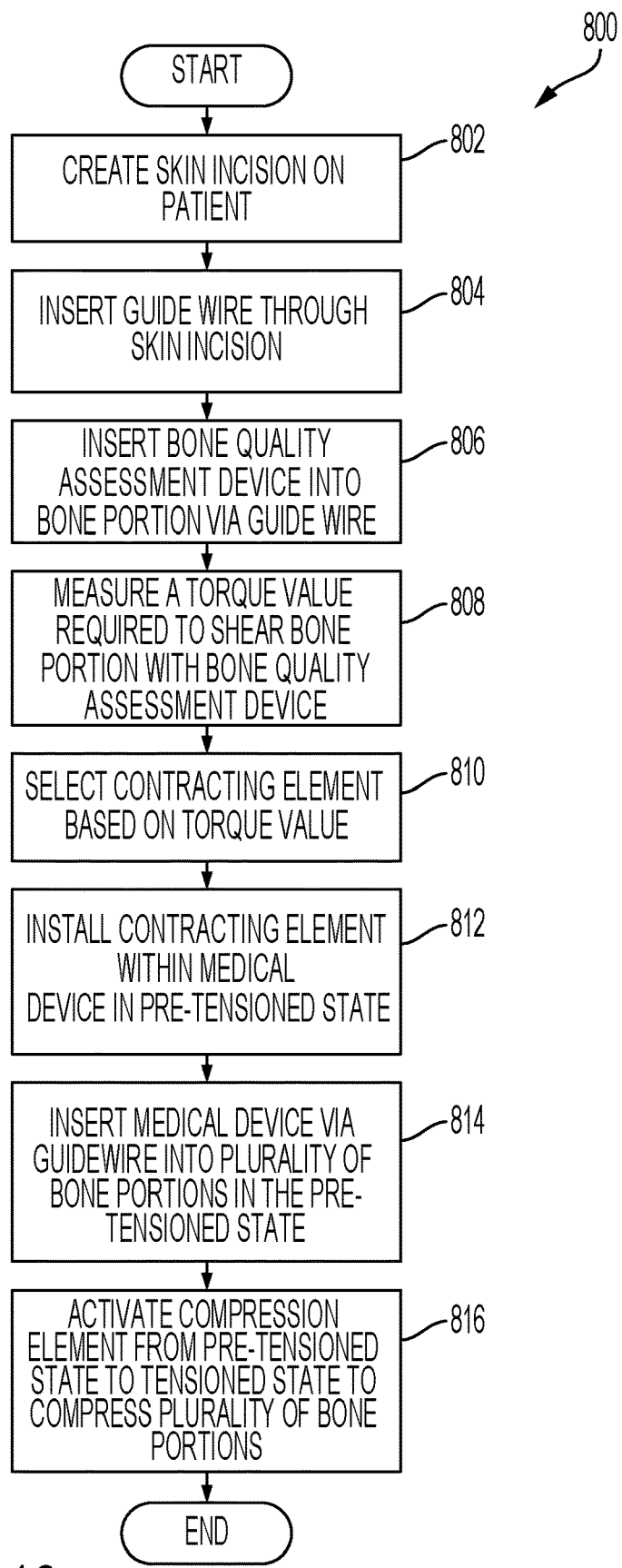
FIG. 16 is another flowchart showing one embodiment of a method for selecting a contracting element based on bone quality measurement in accordance with the principles of this disclosure.

Turning now to FIG. 16, yet another embodiment of a method of selecting a contracting element using bone quality measurements 800 in accordance with the principles of this disclosure is shown. First, at step 802, a skin incision is made on a patient. Next, at step 804, a guide wire is inserted through the skin incision made in step 802. Then, at step 806, the bone quality assessment device is inserted into the first bone portion via the guide wire. Next, at step 808, a torque value required to shear the first bone portion is measured. Next, at step 810 a contracting element is selected based on the torque value. Then, at step 812, the selected contracting element is installed within and medical device in a pre-tensioned state. Next, at step 814, the medical device is inserted by a guide wire into a plurality of bone portions. Finally, at step 816, the contracting element is activated from a pre tensioned state to a tension state to compress the plurality of bone portions.

Figure 17:
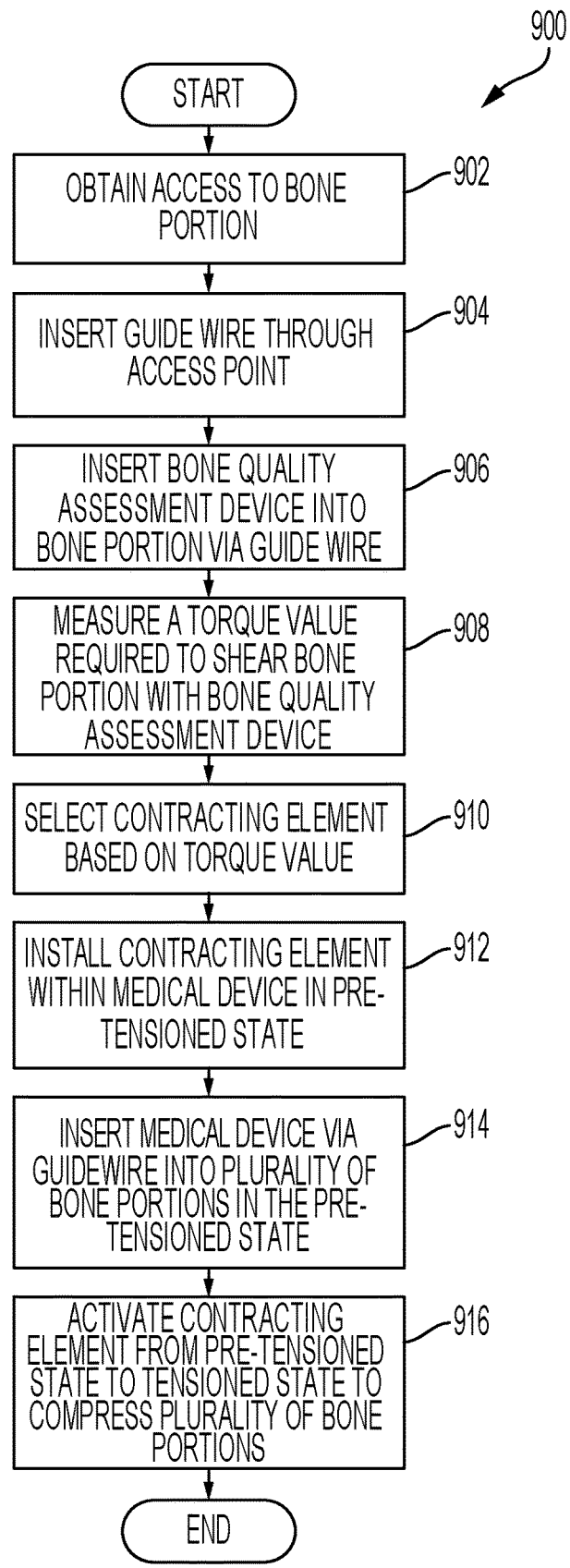
FIG. 17 is another flowchart showing one embodiment of a method for selecting a contracting element based on bone quality measurement in accordance with the principles of this disclosure.

Turning now to FIG. 17, yet another embodiment of a method of selecting an appropriate contracting element using bone quality measurements 900 in accordance with the principles of this disclosure is shown. First, at step 902, access to a bone portion is obtained. Next, at step 904, a guide wire is inserted through the access point made in step 902. Then, at step 906, the bone quality assessment device is inserted into the first bone portion via the guide wire. Next, at step 908, a torque value required to shear the first bone portion is measured. Next, at step 910 a contracting element is selected based on the torque value. Then, at step 912, the selected contracting element is installed within and medical device in a pre-tensioned state. Next, at step 914, the medical device is inserted by a guide wire into a plurality of bone portions. Finally, at step 916, the contracting element is activated from a pre tensioned state to a tension state to compress the plurality of bone portions.

Figure 18:
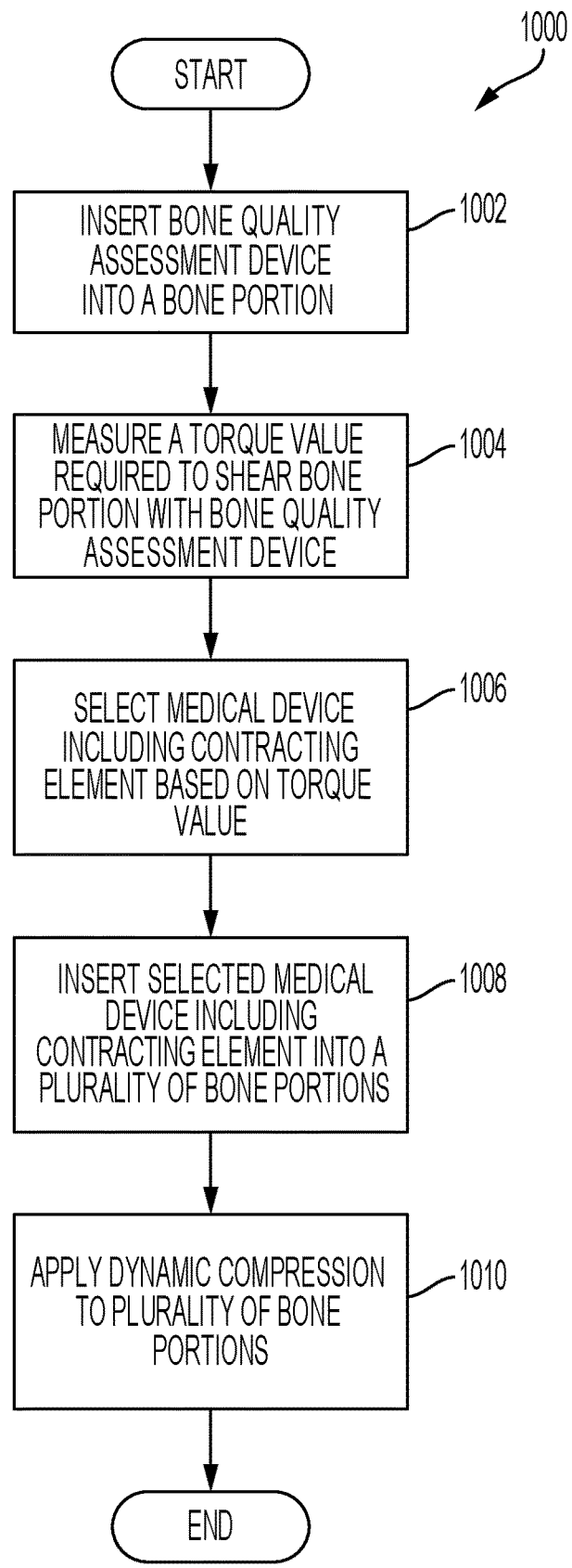
FIG. 18 is another flowchart showing one embodiment of a method for selecting a contracting element based on bone quality measurement in accordance with the principles of this disclosure.

FIG. 18 shows yet another embodiment of a method of selecting inappropriate contracting element using bone quality measurements 1000 in accordance with the principles of this disclosure. First, at step 1002, a bone quality assessment device is inserted into a bone portion. Second, at step 1004 a torque value required to shear the first bone portion is measured. Next, at step 1006, and medical device including a contracting element is selected based on the torque value obtained at step 1004. At step 1008, the selected medical device including an appropriate contracting element is inserted into a plurality of bone portions. Finally, at step 1010, dynamic compression is applied to the plurality of bone portions.

Aspects, features, and benefits of the systems, methods, processes, formulations, apparatuses, and products discussed herein will become apparent from the information disclosed in the exhibits and the other applications as incorporated by reference. Variations and modifications to the disclosed systems and methods may be made without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A method for dynamic bone fixation comprising:
   inserting a bone quality assessment device into a first bone portion of a plurality of bone portions to be compressed via dynamic compression;
   measuring a torque value for shearing the first bone portion with the bone quality assessment device;
   selecting a contracting element for compressing the plurality of bone portions based on the torque value;
   inserting the contracting element into a medical device;
   inserting the medical device comprising the contracting element for applying dynamic compression into the plurality of bone portions; and
   activating the contracting element.

2. The method of claim 1, wherein the torque value is correlated to a bone quality of the plurality of bone portions.

3. The method of claim 2, wherein:
   the method further comprises creating a skin incision;
   inserting the bone quality assessment device into the first bone portion of the patient comprises inserting the bone quality assessment device through the skin incision and into the first bone portion of the patient; and
   inserting the medical device into the plurality of bone portions comprises inserting the medical device through the skin incision and into the plurality of bone portions.

4. The method of claim 3, wherein the bone quality assessment device is inserted into the first bone portion of the patient via a guide wire.

5. The method of claim 4, wherein the medical device is inserted into the plurality of bone portions via the guide wire.

6. The method of claim 5, wherein the medical device is a nail.

7. The method of claim 5, wherein the medical device is a screw.

8. The method of claim 7, wherein the method further comprises:
   seating the medical device into the plurality of bone portions; and
   engaging compression of the plurality of bone portions via the contracting element.

9. The method of claim 8, wherein the medical device does not compress the plurality of bone portions prior to engaging compression of the plurality of bone portions via the contracting element.

10. The method of claim 8, wherein the plurality of bone portions to be compressed are bone fragments from a bone fracture to be repaired.

11. The method of claim 8, wherein the plurality of bone portions to be compressed are bones of a particular joint to be fused.

12. A method for dynamic bone fixation comprising:
    creating a skin incision on a patient;
    inserting a guide wire through the skin incision;
    inserting a bone quality assessment device into a bone portion of a patient via the guide wire, wherein the bone portion is a first bone portion of a plurality bone portions to be compressed via dynamic compression;
    measuring a torque value for shearing the bone portion with the bone quality assessment device;
    selecting a contracting element for compressing the plurality of bone portions based on the torque value;
    inserting the contracting element into a medical device in a pre-tensioned state;
    inserting the medical device comprising the contracting element via the guide wire for applying dynamic compression into the plurality of bone portions; and
    activating the contracting element from the pre-tensioned state to a tensioned state.

13. The method of claim 12, wherein the torque value is correlated to bone quality of the plurality of bone portions.

14. The method of claim 13, wherein the plurality of bone portions to be compressed are bone fragments from a bone fracture to be repaired.

15. The method of claim 13, wherein the plurality of bone portions to be compressed are bones of a particular joint to be fused.

16. The method of claim 13, wherein the medical device is a nail.

17. The method of claim 13, wherein the medical device is a screw.

18. The method of claim 17, wherein the method further comprises:
    seating the medical device into the plurality of bone portions; and
    engaging compression of the plurality of bone portions via the contracting element.

19. The method of claim 18, wherein the medical device does not compress the plurality of bone portions prior to engaging compression of the plurality of bone portions via the contracting element.

20. A method for dynamic bone fixation comprising:
    creating a skin incision on a patient;
    inserting a guide wire through the skin incision;
    inserting a bone quality assessment device into a bone portion of a patient via the guide wire, wherein the bone portion is a first bone portion of a plurality bone portions to be compressed via dynamic compression;
    measuring a torque value for shearing the bone portion with the bone quality assessment device;
    selecting a contracting element for compressing the plurality of bone portions based on the torque value;
    installing the contracting element within a medical device in a pre-tensioned state;
    inserting the medical device comprising the contracting element via the guide wire into the plurality of bone portions in the pre-tensioned state; and
    activating the contracting element from the pre-tensioned state to a tensioned state, thereby compressing the plurality of bone portions via the medical device.

21. A method of selecting a compression fixation comprising the steps of:
    accessing a bone portion;
    inserting a bone quality assessment device into the bone portion;
    measuring a torque value required to shear the bone portion;
    correlating the torque value to bone quality;
    selecting a contracting element for compressing the bone portion based on whether the bone quality will support using the contracting element;
    installing the contracting element into a medical device;
    activating the contracting element; and inserting the medical device comprising the contracting element into the bone portion.

\* \* \* \* \*